(12) United States Patent
Itabashi et al.

(10) Patent No.: US 7,978,600 B2
(45) Date of Patent: Jul. 12, 2011

(54) ELECTRONIC CONTROL UNIT WITH A PLURALITY OF CONTROL CIRCUITS

(75) Inventors: Toru Itabashi, Anjo (JP); Mitsuhiro Kanayama, Takahama (JP); Michio Nakamura, Toyoake (JP); Yoshiyuki Kawase, Nagoya (JP); Atsushi Yamada, Kariya (JP)

(73) Assignee: DENSO Corporation, Kariya (JP)

( * ) Notice: Subject to any disclaimer, the term of this patent is extended or adjusted under 35 U.S.C. 154(b) by 932 days.

(21) Appl. No.: 11/713,810

(22) Filed: Mar. 5, 2007

(65) Prior Publication Data

US 2007/0208470 A1 Sep. 6, 2007

(30) Foreign Application Priority Data

Mar. 6, 2006 (JP) ................................. 2006-059679

(51) Int. Cl.
H04L 29/04 (2006.01)
H04L 12/40 (2006.01)

(52) U.S. Cl. ........ 370/229; 370/242; 370/419; 370/447; 370/462; 701/36

(58) Field of Classification Search ........................ None
See application file for complete search history.

(56) References Cited

U.S. PATENT DOCUMENTS

| | | | |
|---|---|---|---|
| 5,265,215 A | 11/1993 | Fukuda et al. | |
| 5,701,330 A * | 12/1997 | Lippmann et al. | 375/257 |
| 5,812,880 A | 9/1998 | Goto et al. | |
| 6,034,955 A * | 3/2000 | Cho | 370/362 |
| 6,144,887 A | 11/2000 | Kamiya et al. | |
| 6,438,462 B1 | 8/2002 | Hanf et al. | |
| 6,493,593 B1 | 12/2002 | Kamiya et al. | |
| 2001/0014084 A1 | 8/2001 | Miyoshi | |
| 2005/0144237 A1 | 6/2005 | Heredia et al. | |

FOREIGN PATENT DOCUMENTS

| | | |
|---|---|---|
| EP | 1 443 422 | 8/2004 |
| JP | 04-328665 | 11/1992 |
| JP | 08-249021 | 9/1996 |
| JP | 10-171644 | 6/1998 |
| JP | 2000-504517 | 4/2000 |
| JP | 2000-250879 | 9/2000 |
| JP | 2001-320391 | 11/2001 |
| JP | 2003-188862 | 7/2003 |

OTHER PUBLICATIONS

Extended European Search Report, dated Jul. 7, 2008, issued in corresponding European Appln. No. 07004479.7. *In-vehicle LAN and CAN* with partial English translation, printed from http://www.orixrentec.co.jp/tmsite/know/know_carlan.html.
Office Action (1 pg.) dated Sep. 14, 2010 issued in corresponding Japanese Application No. 2006-059679 with an at least partial English-language version thereof (1 pg.).

* cited by examiner

*Primary Examiner* — Daniel J Ryman
*Assistant Examiner* — Michael Fialkowski
(74) *Attorney, Agent, or Firm* — Nixon & Vanderhye P.C.

(57) ABSTRACT

In an ECU, a level adjusting unit communicable to first and second control circuits and a bus transceiver installed in the ECU receives first data and second data respectively transmitted from the first and second control circuits. The bus transceiver is communicable to a communication bus. When the first data and the second data are simultaneously received, the level adjusting unit merges the first data and the second data such that a first electric level of the first data wins with a second electric level of the second data. The level adjusting unit outputs the merged data to the bus transceiver.

37 Claims, 13 Drawing Sheets

ELECTRONIC CONTROL UNIT WITH A PLURALITY OF CONTROL CIRCUITS

CROSS REFERENCE TO RELATED APPLICATIONS

This application is based on Japanese Patent Application 2006-059679 filed on Mar. 6, 2006. This application claims the benefit of priority from the Japanese Patent Application, so that the descriptions of which are all incorporated herein by reference.

FIELD OF THE INVENTION

The present invention relates to electronic control units for controlling a target device, which are capable of carrying out data communications with external devices via a communication bus.

More particularly, the present invention relates to electronic control units having a plurality of control circuits for controlling a target device, which include a function of allowing data communications between the plurality of control circuits and external devices via a communication bus.

BACKGROUND OF THE INVENTION

Modern vehicles have installed therein a large number of electronic control units, referred to simply as "ECUs". ECUs installed in a vehicle are communicably connected to each other via a communication bus, such as a CAN (Controller Area Network) bus, a LIN (Local Interconnect Network) bus, or the like to share data required for integral control of the vehicle and to carry out the integral control of the vehicle using the shared data.

Such conventional vehicle control systems including a large number of ECUs communicated with each other in a communication bus are disclosed as an example in the U.S. Pat. No. 6,438,462B1 corresponding to Japanese Examined Patent Publication No. 3343685.

The number of ECUs to be installed in a vehicle has increased as in-vehicle devices have become more sophisticated in functionality, and also it has increased in order to improve the safety of a vehicle. The more the number of ECUs to be installed in a vehicle increases, the more the number of ECUs to be connected to a communication bus installed in the vehicle increases.

The increase in the number of ECUs to be connected to a communication bus increases the length of a communication path between the communication bus and each ECU to be connected thereto. This may complicate communication path design between the ECUs and the communication bus in order to secure communication reliability, and therefore, make it difficult to secure communication reliability.

For addressing the problem, it is proposed to monolithically integrate, into one ECU, various functions required for vehicle control and conventionally implemented by several ECUs.

When various functions required for vehicle control are integrated into one ECU, it is proposed to design a new control circuit, such as a new microcomputer, capable of implementing all of the various functions by various pieces of software, and to install the newly designed control circuit into the one ECU.

However, this approach increases not only the cost of developing the various pieces of software, but also the processing load of the new control circuit significantly.

For meeting the increase in the processing load of the new control circuit, as the new control circuit, a high-performance microcomputer whose processing speed is faster than microcomputers that are installed as corresponding control circuits in the several ECUs is required to constitute the one ECU.

In addition, because the increase in the processing load of the new control circuit increases power consumption of the new control circuit, new measures are required against the increase in power consumption of the new control circuit. For example, measures for heatsinking are required to be taken against increase in heat due to the increase in power consumption of the new control circuit.

In view of the above descriptions, when various functions conventionally implemented by several ECUs are integrated into one ECU, it is preferable to install several control circuits respectively installed in the several ECUs into the one ECU; these several control circuits are designed to implement the various functions.

This approach can eliminate the need to design a new control circuit capable of implementing all of the various functions required for vehicle control, and can integrate the several ECUs using their existing control circuits. For these reasons, it is possible to relatively simply change the specifications of a vehicle control system using several ECUs at low cost.

Note that, because each of the several control units can implement a corresponding at least one of the various functions while communicating with another control unit, it individually includes a communication function.

Therefore, when several control circuits are installed in one ECU (integrated ECU), because of reducing the number of communication paths between the integrated ECU and a communication bus, it is preferably to couple the integrated ECU to the communication bus via a single transmission and reception route.

In order to couple the integrated ECU to the communication bus via the single transmission and reception route, a bus transceiver installed in the integrated ECU, which allows data communications with an external device via the communication bus, is made shareable among the several control circuits. For making the bus transceiver sharable among the several control circuits, it is possible to use a communication arbitration circuit for arbitrating access requests to the external device transmitted from the several control circuit. The communication arbitration circuit is disclosed as an example in the U.S. Pat. No. 5,812,880 corresponding to Japanese Examined Patent Publication No. 3346079.

In applying the communication arbitration circuit to arbitration of the access requests transmitted from the several control circuits, the communication arbitration circuit has functions of:

holding the access requests;

sequentially outputting, to the bus transceiver, the access requests;

holding data transmitted from the bus transceiver; and outputting the held data to at least one of the control circuits designated as a target device by the held data.

However, this application of the arbitration circuit to arbitration of the access requests transmitted from the several control circuits may make it necessary for the arbitration circuit to provide a storage area for holding the access requests.

In addition, in order to improve high-speed communication required for vehicle control, it may be necessary for the arbitration circuit to provide a signal processing circuit capable of executing the arbitration task set forth above at high speed.

SUMMARY OF THE INVENTION

In view of the background, an object of at least one aspect of the present invention is to provide an electronic control unit having a plurality of control circuits that share a bus transceiver allowing data communications via the communication bus. The electronic control unit of the at least one aspect of the present invention allows the plurality of control circuits to carry out communications via the bus transceiver and the communication bus without using such a communication arbitration circuit for arbitrating access requests transmitted from the plurality of control circuits.

According to one aspect of the present invention, there is provided an electronic control unit includes a bus transceiver communicable to a communication bus. The communication bus allows data with an electrical dominant level to be asserted thereon in priority to data with an electrical recessive level different from the electrical dominant level. The electrical dominant level is higher in priority than the electrical recessive level. The electronic control unit includes a first control circuit for control of a target. The first control circuit works to generate first data for transfer via the communication bus and transmit the generated first data. The electronic control unit includes a second control circuit for control of a target. The second control circuit works to generate second data for transfer via the communication bus and transmit the generated second data. The first data and second data generated by the first and second control circuits each has any one of a first electric level and a second electric level. The first and second electric levels correspond to the electric dominant and recessive levels, respectively. The electronic control unit includes a level adjusting unit communicable to the first and second control circuits and the bus transceiver. The level adjusting unit is configured to receive the first data and second data respectively transmitted from the first and second control circuits, and when the first data and the second data are simultaneously received, merge the first data and the second data such that the first electric level wins with the second electric level. The level adjusting unit is also configured to output the merged data to the bus transceiver.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Figure 1:
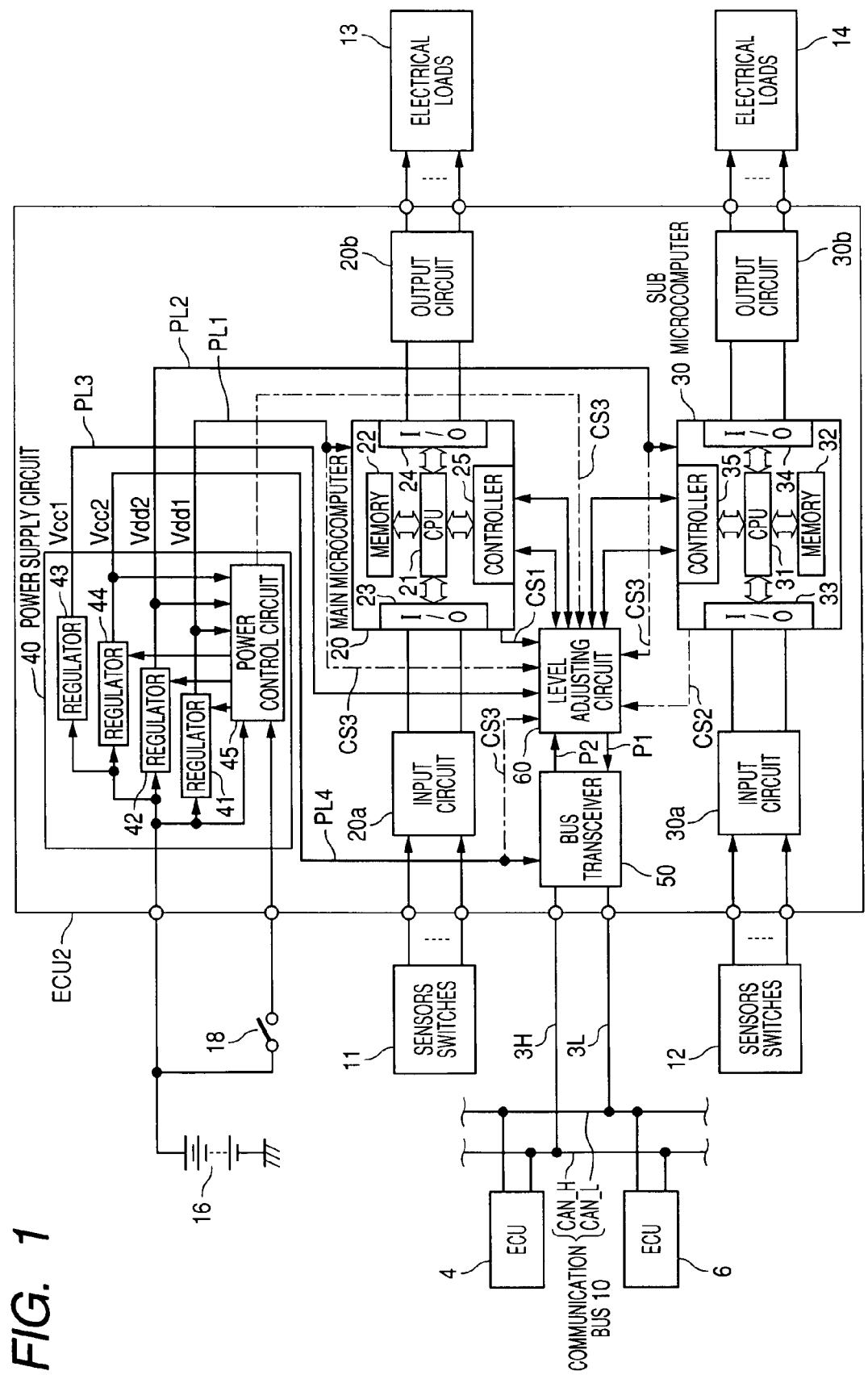
FIG. 1 is a block diagram schematically illustrating an example of the configuration of a vehicle control system including an electronic control unit (ECU) according to a first embodiment of the present invention.

Embodiments of the present invention will be described hereinafter with reference to the accompanying drawings. In the drawings, like reference characters refer to like parts.

First Embodiment

An electronic control unit 2, referred to simply as an electronic control unit (ECU) 2, to which the present invention is applied is installed beforehand in a vehicle. The ECU 2 is designed to control at least one target device, such as an engine, installed in the vehicle.

The ECU 2 and other ECUs 4, 6, . . . are communicably coupled to a communication bus 10 to constitute a vehicle control system installed in the vehicle. Each of the other ECUs 4, 6, . . . is designed to control a corresponding at least one of other target devices installed in the vehicle.

In the first embodiment, the communication bus 10 is designed as a CAN bus consisting essentially of a pair of two signal lines (two-wire bus). Specifically, the two signal lines are termed "CAN_H" and "CAN_L" and, in the quiescent state, sit at a predetermined voltage, such as 2.5 V.

A first different voltage between the CAN_H and the CAN_L that is lower in voltage level than the CAN_H represents a "dominant level". The dominant level on the communication bus 10 corresponds to a bit of logical 0 having a predetermined low voltage, such as 0 V, in digital data (binary data). The bit of logical 0 will be therefore referred to as "dominant bit" hereinafter.

For example, the first different voltage of 2.0 V between 3.5 V on the CAN_H and 1.5 V on the CAN_L represents the dominant level corresponding to a dominant bit.

In contrast, a second different voltage between the CAN_H and the CAN_L that is equal to or just higher in voltage level than the CAN_H represents a "recessive level". The recessive level on the communication bus 10 corresponds to a bit of logical 1 having a predetermined high voltage, such as 5 V, in digital data (binary data). The bit of logical 1 will be therefore referred to as "recessive bit" hereinafter.

For example, the second different voltage of 0 V between 2.5 V on the CAN_H and 2.5 V on the CAN_L represents the recessive level corresponding to a recessive bit.

On the communication bus 10, when there is a collision between a dominant bit and a recessive bit, the dominant bit wins so that the dominant bit (the first different voltage) is asserted on the communication bus 10 and the recessive bit (the second different voltage) is not asserted thereon.

The ECU 2 are coupled to the CAN_H and CAN_L of the communication bus 10 through a pair of two signal lines 3H and 3L, respectively.

Specifically, the ECU 2 is operative to communicate with at least one of the other ECUs 4, 6, . . . via the communication bus 10 to thereby obtain pieces of data required to control the at least one target device of the ECU 2, and give pieces of data required to control the at least one target device of the at least one of the other ECUs 4, 6, . . . .

The ECU 2 is composed of a main microcomputer 20 and a sub microcomputer 30 as control circuits for controlling the at least one target device. The sub microcomputer 30 works in accordance with instructions passed from the main microcomputer 20.

Specifically, the ECU 2 is designed as an integrated ECU in which several control circuits (main microcomputer 20 and sub microcomputer 30) are installed beforehand.

The ECU 2 is composed of a first input circuit 20a and a first output circuit 20b for the main microcomputer 20. In addition, the ECU 2 is composed of a second input circuit 30a and a second output circuit 30b for the sub microcomputer 30.

The first input circuit 20a is connected to various sensors and switches 11 installed in the vehicle. The various sensors and switches 11 are operative to measure pieces of information associated with the operating conditions of the at least one target device.

Specifically, the first input circuit 20a is operative to:

monitor, at given timings, measurands (measured pieces of information associated with the operating conditions of the at least one target device) output from the corresponding sensors and switches 11;

convert the monitored measurands into pieces of measurement data readable by the main microcomputer 20; and pass the converted pieces of measurement data to the main microcomputer 20.

The first output circuit 20b is connected to various electrical loads 13 mounted on various parts of the at least one target device. For example, the electrical loads 13 include various types of actuators each of which converts electrical drive signals into mechanical movement required to control the operating conditions of the at least one target device.

Specifically, the first output circuit 20b is operative to:

receive target-control instructions respectively for the electrical loads 13; and respectively supply, to the electrical loads 13, electrical drive signals whose magnitude and supply period are determined based on the received target-control instructions.

Similarly, the second input circuit 30a is connected to various sensors and switches 12 installed in the vehicle as well as the first input circuits 20a.

Specifically, the second input circuit 30a is operative to:

monitor, at given timings, measurands (measured pieces of information associated with the operating conditions of the at least one target device) output from the corresponding sensors and switches 12;

convert the monitored measurands into pieces of measurement data readable by the sub microcomputer 30; and pass the converted pieces of measurement data to the sub microcomputer 30.

The second output circuit 30b is connected to various electrical loads 14 mounted on various parts of the at least one target device as well as the first output circuit 20b.

Specifically, the second output circuit 30b is operative to:

receive target-control instructions respectively for the electrical loads 14; and respectively supply, to the electrical loads 14, electrical drive signals whose magnitude and supply period are determined based on the received target-control instructions.

The main microcomputer 20 is programmed to compute, based on the input pieces of measurement data from the input circuit 20a, the target control instructions, and output the computed target control instructions to the output circuit 20b.

The computed target control instructions correspond to certain magnitude and supply period of the electrical drive signals to be supplied to the electrical loads 13. The magnitude and supply period of the electrical drive signals are required for the electrical loads 13 to individually maintain the operating conditions of the at least one target device to respectively corresponding target operating conditions. The target operating conditions of the at least one target device vary depending on the pieces of information measured by the sensors and switches 11.

Similarly, under control of the main microcomputer 20, the sub microcomputer 30 is programmed to compute, based on the input pieces of measurement data from the input circuit 30a, the target control instructions, and output the computed target control instructions to the output circuit 30b.

The computed target control instructions correspond to certain magnitude and supply period of the electrical drive signals to be supplied to the electrical loads 14. The magnitude and supply period of the electrical drive signals are required for the electrical loads 14 to individually keep the operating conditions of the at least one target device to respectively corresponding target operating conditions. The target operating conditions of the at least one target device vary depending on the pieces of information measured by the sensors and switches 12.

Accordingly, the individual operating conditions of the at least one target device can be properly maintained to respectively corresponding target operating conditions.

Specifically, the microcomputers 20 and 30 respectively include CPUs 21 and 31, memories 22 and 32, input interfaces (I/Os) 23 and 33, output interfaces (I/Os) 24 and 34, and communication controllers 25 and 35.

The CPUs 21 and 31 are operative to execute control programs including CAN communication programs and installed in the corresponding memories 22 and 32, thereby carrying out corresponding various tasks including the target control instruction computing tasks.

The memories 22 and 32 respectively store in advance the control programs and data required therefor to execute the control programs. The memories 22 and 32 are designed to be quickly accessible by the corresponding CPUs 21 and 31. In addition, the memories 22 and 32 are operative to store therein data processed by the corresponding CPUs 21 and 31.

The input interfaces 23 and 33 are designed to capture the corresponding pieces of measurement data respectively passed from the first and second input circuits 20a and 30a and to pass them to the corresponding CPUs 21 and 31.

The output interfaces 24 and 34 are designed to send, to the corresponding output circuits 20b and 30b, the target-control instructions passed from the corresponding CPUs 21 and 31.

The communication controllers 25 and 35 are operative to allow the corresponding CPUs 21 and 31 to communicate with external devices, such as the other ECUs, via the communication bus 10.

In the first embodiment, because the communication bus 10 is designed as the CAN bus (CAN_H and CAN_L lines), the communication controllers 25 and 35 are designed as common CAN controllers.

Specifically, the communication controllers (CAN controllers) 25 and 35 are operative to generate, as communication signals to be communicable with the external devices via the communication bus 10, communication messages whose data formats are predetermined in the CAN protocol. The communication messages have a data format predetermined in the CAN protocol will be referred to as "CAN messages" hereinafter.

Specifically, the CAN messages consist essentially of a train of dominant bits (logical 0) corresponding to predetermined low voltage levels and recessive bits (logical 1) corresponding to predetermined high voltage levels.

A CAN message consists of a CAN frame predetermined in the CAN protocol. The CAN frame begins with an SOF (Start of Frame) with one dominant bit.

The CAN frame has, at its first information field subsequent to the SOF, an identifier field consisting of an identifier. The identifier is composed of a predetermined number of, for example, 11 or 29 bits. The CAN frame also has, at an information field after the identifier field, a data field consisting of variable data corresponding to a message to be transferred.

The identifier allows a target node of the corresponding frame to be identified. In addition, all the bits of the identifier allow a priority of the corresponding CAN message to be identified.

In the first embodiment, the lower a number of all the bits of the identifier of a CAN message is, the higher the priority of the identifier is.

Thus, each of the CPUs 21 and 31 is operative to communicate with the other ECUs 4, 6, . . . and with another one of the CPUs 21 and 31 via the corresponding one of the CAN controllers 25 and 35 so as to capture various items of data required therefor to control the at least one target device. The captured items of data are used for the target control instruction computing tasks of the CPUs 21 and 31 and/or another task.

The ECU 2 is also composed of a bus transceiver 50, a level adjusting circuit 60, and a power supply circuit 40.

The bus transceiver 50 is communicably coupled to the communication bus 10 via the two signal lines 3H and 3L. The bus transceiver 50 is communicably coupled to the communication controllers 25 and 35 of the main and sub microcomputers 20 and 30 through communication paths, such as conductive lead paths, and is operative to allow communications between the main and sub microcomputers 20 and 30 and the other devices on the communication bus 10. Similarly, each of the other devices includes a bus transceiver designed to be similar in configuration to the bus transceiver 50.

The level adjusting circuit 60 is provided on the communication paths between each of the communication controllers 25 and 35 and the bus transceiver 50.

The power supply circuit 40 is connected to the main microcomputer 20, the sub microcomputer 30, the level adjusting circuit 60, and the bus transceiver 50 via different power supply lines PL1, PL2, PL3, and PL4, respectively. The power supply circuit 40 is operative to individually supply power to the main microcomputer 20, the sub microcomputer 30, the level adjusting circuit 60, and the bus transceiver 50 through the respective power supply lines.

Specifically, the power supply circuit 40 includes first to fourth regulators 41 to 44 connected to a battery 16 installed in the vehicle.

The first, second, third, and fourth regulators 41, 42, 43, and 44 are operative to receive power supplied from the battery 16 and to generate power supply voltages Vdd1, Vdd2, Vcc1, and Vcc2 for the components 20, 30, 60, and 50 via the power supply lines PL1, PL2, PL3, and PL4, respectively.

The power supply circuit 40 includes a power control circuit 45 connected to each of the first, second, and fourth regulators 41, 42, and 44. The power control circuit 45 works to detect the power supply voltages Vdd1, Vdd2, and Vcc2 respectively output from the first, second, and fourth regulators 41, 42, and 44 except for the power supply voltage Vcc1 for the level adjusting circuit 60. The power control circuit 40 also works to control operations of the first, second, and fourth regulators 41, 42, and 44 based on the detected voltages, Vdd1, Vdd2, and Vcc2 respectively.

Specifically, for example, in the first embodiment, the third regulator 43 allows power to be continuously supplied to the level adjusting circuit 60 while at least one of the circuits 20, 30, and 50 coupled to the circuit 60 is running.

In addition, the power supply circuit 40 is connected to an ignition switch 18 installed in the vehicle. The ignition switch 18 is generally mounted on a steering column or a dashboard of the vehicle. The ignition switch 18 is operative to connect and disconnect an ignition system of the engine, which provides an electric current or spark to ignite an air-fuel mixture in combustion chambers of the engine, from the battery 16 so that the engine can be started and stopped as desired.

Specifically, when the ignition switch 18 is turned on, the power control circuit 45 starts to operate on power supplied from the battery 16.

While the ignition switch 18 is in on state so that the engine is running, the power control circuit 45 works to control the first, second, and fourth regulators 41, 42, and 44, thereby causing the regulators 41, 42, and 44 to carry out power supply to the main microcomputer 20, the sub microcomputer 30, and the bus transceiver 50.

When the ignition switch 18 is turned off, the power control circuit 45 works to stop the control of the first, second, and fourth regulators 41, 42, and 44, thereby causing the regulators 41, 42, and 44 to interrupt power supply to the main microcomputer 20, the sub microcomputer 30, and the bus transceiver 50.

In addition, when detecting an abnormal voltage or abnormal current being supplied from the regulators 41 and 42 to the main and sub microcomputers 20 and 30, the power control circuit 45 works to carry out protection of the main and sub microcomputers 20 and 30. Specifically, as an example of the protection, the power control circuit 45 causes the regulators 41 and 42 to reduce the power supply voltages Vdd1 and Vdd2 for the main and sub microcomputers 20 and 30.

Figure 2:
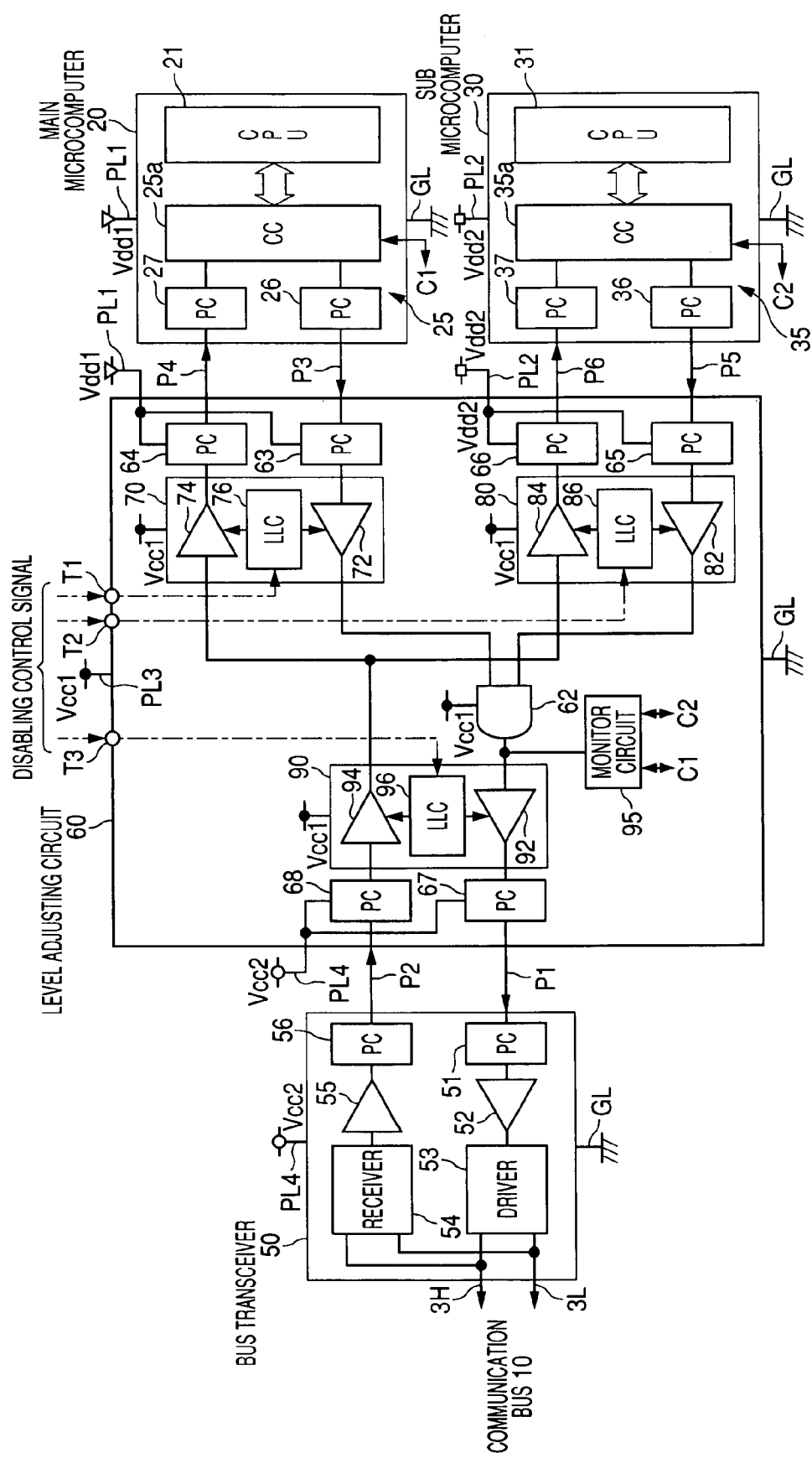
FIG. 2 is a block diagram schematically illustrating an example of the configurations of a bus transceiver, a level adjusting circuit, and communication controllers illustrated in FIG. 1.

FIG. 2 schematically illustrates an example of the configurations of the bus transceiver 50, the level adjusting circuit 60, and the communication controllers 25 and 35 illustrated in FIG. 1.

Referring to FIG. 2, the bus transceiver 50 includes a first protection circuit (abbreviated as PC in the figures) 51, a first line buffer 52, a driver 53, a receiver 54, a second line buffer 55, and a second protection circuit 56.

The first protection circuit 51 is coupled to the level adjusting circuit 60 via a communication path P1. The first protection circuit 51 is provided with, for example, diodes (not shown). One of the diodes is connected between the communication path P1 and the power supply line PL4, and the other thereof connected between the communication path P1 and a ground line GL. These connections allow a voltage change on the communication path P1 to be limited within the range of the power supply voltage Vcc2. This makes it possible to protect the components in the bus transceiver 50.

The first line buffer 52 is connected at its an input terminal to the first protection circuit 51 and operative to sequentially receive and hold bits (dominant bits and recessive bits) of a CAN message sent from the level adjusting circuit 60 via the first protection circuit 51.

The driver 53 is connected to an output terminal of the first line buffer 52 and to the CAN_H and CAN_L of the communication bus 10 via the respective two signal lines 3H and 3L. The driver 53 is operative to sequentially transmit, to the CAN_H and CAN_L of the communication bus 10 via the two signal lines 3H and 3L, the CAN message held in the first line buffer 52 bit-by-bit in the following manner:

Specifically, for transmitting a dominant bit (logical 0) to the communication bus 10 in the CAN message, the driver 53 generates the first different voltage between the CAN_H and the CAN_L that is lower in voltage level than the CAN_H; this first different voltage represents the "dominant level".

For transmitting a recessive bit (logical 1) to the communication bus 10 in the CAN message, the driver 53 generates the second different voltage between the CAN_H and the CAN_L that is equal to or just higher in voltage level than the CAN_H; this second difference voltage represents the "recessive level".

The receiver 54 is connected to the CAN_H and CAN_L of the communication bus 10 via the respective two signal lines 3H and 3L and is operative to sequentially capture voltage levels in a CAN message each of which appears between the CAN_H and the CAN_L. The receiver 54 is operative to sequentially convert the captured voltage levels into dominant bits (predetermined low levels) or recessive bits (predetermined high levels) in the following manner:

Specifically, as a captured voltage level, when the first different voltage appears between the CAN_H and the CAN_L representing the "dominant level", the receiver 54 generates a dominant bit (logical 0) having the predetermined low level.

In contrast, as a captured voltage level, when the second different voltage appears between the CAN_H and the CAN_L representing the "recessive level", the receiver 54 generates a recessive bit (logical 1) having the predetermined high level.

The receiver 54 is operative to sequentially hold the converted bits (dominant bits and recessive bits) in the second line buffer 55 as a CAN message. The dominant bits and recessive bits of the CAN message held in the second line buffer 55 are transmitted bit-by-bit to the level adjusting circuit 60 via the second protection circuit 56.

The second protection circuit 56 is coupled to the level adjusting circuit 60 via a communication path P2. As well as the first protection circuit 51, the second protection circuit 56 is provided with, for example, diodes (not shown). One of the diodes is connected between the communication path P2 and the power supply line PL4, and the other thereof connected between the communication path P2 and the ground line GL.

These connections allow a voltage change on the communication path P2 to be limited within the range of the power supply voltage Vcc2, protecting the components in the bus transceiver 50.

Referring to FIG. 2, the level adjusting circuit 60 includes an AND gate 62, third to eighth protection circuits 63 to 68, first, second, and third buffer circuits 70, 80, and 90, and a monitor circuit 95. Each of the third to eighth protection circuits 63 to 68 is provided with, for example, diodes (not shown).

In addition, the communication controller 25 of the main microcomputer 20 includes a communication control circuit 25a, a ninth protection circuit 26, and a tenth protection circuit 27.

The communication control circuit 25a is connected to the ninth and tenth protection circuits 26 and 27 each of which is provided with diodes (not shown). The ninth and tenth protection circuits 26 and 27 are connected to the third and fourth protection circuits 63 and 64 of the level adjusting circuit 60 via communication paths P3 and P4, respectively.

The communication circuit 25a is operative to:

receive data that the CPU 21 wants to send to at least one of the external devices on the communication bus 10 and that is passed from the CPU 21;

generate a CAN message consisting a CAN frame (a train of dominant bits and recessive bits) set forth above representing the received data;

transmit bit-by-bit the generated CAN message to the level adjusting circuit 60 via the ninth protection circuit 26;

receive bit-by-bit a CAN message transmitted from the level adjusting circuit 60 via the tenth protection circuit 27; and pass the received CAN message to the CPU 21.

The ninth protection circuit 26 is coupled to the communication path P3. One of the diodes of the ninth protection circuit 26 is connected between the communication path P3 and the power supply line PL1, and the other thereof connected between the communication path P3 and a ground line GL. These connections allow a voltage change on the communication path P3 to be limited within the range of the power supply voltage Vdd1, protecting the components in the main microcomputer 20.

The tenth protection circuit 27 is coupled to the level adjusting circuit 60 via a communication path P4. Because the tenth protection circuit 27 has a substantially identical configuration of the ninth protection circuit 26, the tenth protection circuit 27 allows a voltage change on the communication path P4 to be limited within the range of the power supply voltage Vdd1, protecting the components in the main microcomputer 20.

In addition, the third and fourth protection circuits 63 and 64 have substantially identical configurations of the ninth and tenth protection circuits 26 and 27, respectively. For this reason, the third protection circuit 63 allows a voltage change on the communication path P3 to be limited within the range of the power supply voltage Vdd1. Similarly, the fourth protection circuit 64 allows a voltage change on the communication path P4 to be limited within the range of the power supply voltage Vdd1.

Similarly, the communication controller 35 of the sub microcomputer 30 includes a communication control circuit 35a, an eleventh protection circuit 36, and a twelfth protection circuit 37.

The communication control circuit 35a is connected to the eleventh and twelfth protection circuits 36 and 37 each of which is provided with, for example, diodes. The eleventh and twelfth protection circuits 36 and 37 are connected to the fifth and sixth protection circuits 65 and 66 of the level adjusting circuit 60 via communication paths P5 and P6, respectively.

The communication control circuit 35a is operative to:

receive data that the CPU 31 wants to send to at least one of the external devices on the communication bus 10 and that is passed from the CPU 31;

generate a CAN message consisting a CAN frame (a train of dominant bits and recessive bits) set forth above representing the received data;

transmit bit-by-bit the generated CAN message to the level adjusting circuit 60 via the eleventh protection circuit 36;

receive bit-by-bit a CAN message transmitted from the level adjusting circuit 60 via the twelfth protection circuit 37; and pass the received CAN message to the CPU 31.

The eleventh protection circuit 36 is coupled to the communication path P5. One of the diodes of the eleventh protection circuit 36 is connected between the communication path P5 and the power supply line PL2, and the other thereof connected between the communication path P5 and a ground line GL. These connections allow a voltage change on the communication path P5 to be limited within the range of the power supply voltage Vdd2, protecting the components in the sub microcomputer 30.

The twelfth protection circuit 37 is coupled to the level adjusting circuit 60 via a communication path P6. Because the twelfth protection circuit 37 has a substantially identical configuration of the eleventh protection circuit 36, the twelfth protection circuit 37 allows a voltage change on the communication path P6 to be limited within the range of the power supply voltage Vdd2, protecting the components in the sub microcomputer 30.

The fifth and sixth protection circuits 65 and 66 have substantially identical configurations of the eleventh and twelfth protection circuits 36 and 37, respectively. For this reason, the fifth protection circuit 65 allows a voltage change on the communication path P5 to be limited within the range of the power supply voltage Vdd2. Similarly, the sixth protection circuit 66 allows a voltage change on the communication path P6 to be limited within the range of the power supply voltage Vdd2.

The first buffer 70 includes third and fourth line buffers 72 and 74, and a level lock circuit (abbreviated as LLC in the figures) 76.

The third line buffer 72 is connected at its input terminal to the third protection circuit 63 and at its output terminal to a first input terminal of the AND gate 62.

The third line buffer 72 is operative to sequentially receive and hold bits (dominant bits and recessive bits) of a CAN message sent from the main microcomputer 20 via the third protection circuit 63, and to send bit-by-bit the CAN message held therein to the AND gate 62.

The fourth line buffer 74 is connected at its output terminal to the fourth protection circuit 64 and at its input terminal to the third buffer circuit 90.

The fourth line buffer 74 is operative to sequentially receive and hold bits (dominant bits and recessive bits) of a CAN message sent from the third buffer 90, and to send bit-by-bit the CAN message held therein to the main microcomputer 20 via the fourth protection circuit 64.

The second buffer 80 includes fifth and sixth line buffers 82 and 84, and a level lock circuit 86.

The fifth line buffer 82 is connected at its input terminal to the fifth protection circuit 65 and at its output terminal to a second input terminal of the AND gate 62.

The fifth line buffer 82 works to sequentially receive and hold bits (dominant bits and recessive bits) of a CAN message sent from the sub microcomputer 30 via the fifth protection circuit 65, and to send bit-by-bit the CAN message held therein to the AND gate 62.

The sixth line buffer 84 is connected at its output terminal to the sixth protection circuit 66 and at its input terminal to the third buffer circuit 90.

The sixth line buffer 84 is operative to sequentially receive and hold bits (dominant bits and recessive bits) of a CAN message sent from the third buffer 90, and to send bit-by-bit the CAN message held therein to the sub microcomputer 30 via the sixth protection circuit 66.

The seventh and eighth protection circuits 67 and 68 have substantially identical configurations of the first and second protection circuits 51 and 56, respectively. For this reason, the seventh protection circuit 67 allows a voltage change on the communication path P1 to be limited within the range of the power supply voltage Vcc2. Similarly, the eighth protection circuit 68 allows a voltage change on the communication path P2 to be limited within the range of the power supply voltage Vcc2.

The third buffer 90 includes seventh and eighth line buffers 92 and 94, and a level lock circuit 96.

The seventh line buffer 92 is connected at its output terminal to the seventh protection circuit 67 and at its input terminal to an output terminal of the AND gate 62.

The seventh line buffer 92 is operative to sequentially receive and hold bits (dominant bits and recessive bits) of data (CAN message) output from the AND gate 62, and to send bit-by-bit the output data held therein to the bus transceiver 50.

The eighth line buffer 94 is connected at its input terminal to the eighth protection circuit 68 and at its output terminal to both the input terminals of the fourth line buffer 74 and the sixth line buffer 84.

The eighth line buffer 94 is operative to sequentially receive and hold bits (dominant bits and recessive bits) of a CAN message sent from the bus transceiver 50 via the eighth protection circuit 68, and to send bit-by-bit the CAN message held therein to both the fourth and sixth line buffers 74 and 84.

As described above, the AND gate 62 has the first and second input terminals and the output terminal.

Specifically, the AND gate 62 is operative to:

give priority to transference of one of CAN messages sent from the third and fifth line buffers 72 and 82 when the SOF bit of one of the CAN messages is input to the AND gate 62 sooner than the other thereof; and when the SOF bits of CAN messages sent from the third and fifth line buffers 72 and 82 are simultaneously input thereto, merge the CAN messages with each other bit-by-bit such that a dominant bit (low level) of each of the CAN messages is asserted on the output terminal of the AND gate 62 if a dominant bit of one of the CAN messages and a recessive bit of the other thereof simultaneously appears on the first and second input terminals. The dominant and recessive bits correspond to the dominant and recessive levels to be asserted on the communication bus 10, respectively.

For example, when the SOF bits of CAN messages sent from the third and fifth line buffers 72 and 82 are simultaneously input to the AND gate 62, the AND gate 62 caries out logical AND combination of the remaining bits of one of the CAN messages with those of the other thereof bit-by-bit.

The logical AND combination allows a dominant bit of one of the CAN messages to "win" if a dominant bit of one of the CAN messages and a recessive bit of the other thereof simultaneously appears on the first and second input terminals.

The monitor circuit 95 is connected to the output terminal of the AND gate 62 and to each of the communication circuits 25*a* and 35*a* of the main and sub microcomputers 20 and 30.

The monitor circuit 95 is operative to monitor a bit (level) to be asserted on the output terminal of the AND gate 62 and to send the monitor result to each of the communication circuits 25*a* and 35*a* of the main and sub microcomputers 20 and 30.

In the level adjusting circuit 60, the first and third buffers 70 and 90 constitute part of communication routes between the bus transceiver 50 and the main microcomputer 20, and similarly, the second and third buffers 80 and 90 constitute part of communication routes between the bus transceiver 50 and the sub microcomputer 30.

In the first, second, and third buffers 70, 80, and 90 set forth above, the level lock circuits 76, 86, and 96 are provided, respectively.

The level lock circuits 76, 86, and 96 are connected to first, second, and third input terminals T1, T2, and T3 of the level adjusting circuit 60. The first to third input terminals T1 to T3 of the level adjusting circuit 60 are connected to at least one of external units of, for example, the power control circuit 45, the main microcomputer 20, the sub microcomputer 30, and the power supply lines PL1, PL2, and PL4.

Each of the level lock circuits 76, 86, and 96 is operative to disable corresponding communication routes when a disabling control signal is input thereto via a corresponding one of the first, second, and third input terminals T1, T2, and T3.

For example, when the voltage level of at least one of the input terminals T1, T2, and T3 is fixed to a voltage level corresponding to open of the at least one of the input terminals T1, T2, and T3 (no loads being connected to the at least one of the input terminals T1, T2, and T3), the disabling signal is input from the at least one of the input terminals T1, T2, and T3 to a corresponding at least one of the level lock circuits 76, 86, and 96.

In addition, when the voltage level of at least one of the input terminals T1, T2, and T3 is fixed to a voltage level in which no power supply voltage is fed to at least one of the input terminals T1, T2, and T3, the disabling signal is input from the at least one of the input terminals T1, T2, and T3 to a corresponding at least one of the level lock circuits 76, 86, and 96.

Specifically, when the disabling control signal is input to at least one level lock circuit from a corresponding terminal itself or an external unit via a corresponding terminal, the at least one level lock circuit is operative to lock output levels of its corresponding line buffers to the high level. The high level corresponds to the recessive level on the communication bus 10.

This prevents dominant bits (predetermined low levels) from being transferred through the line buffers of at least one of the level lock circuits 76, 86, and 96. Therefore, it is possible to disable communication routes constituted by the level adjusting circuit 60; these disabled communication routes correspond to the line buffers of at least one of the level lock circuits 76, 86, and 96.

In addition, as described above, the third and fourth protection circuits 63 and 64 allow a voltage change on the communication paths P3 and P4 to be limited within the range of the power supply voltage Vdd1 for the main microcomputer 20. Thus, even if power supply from the power supply circuit 40 is interrupted to the main microcomputer 20, a current can be prevented from flowing from the level adjusting circuit 60 into the main microcomputer 20 via the communication paths P3 and P4. This makes it possible to protect the components in the main microcomputer 20 during power supply interruption thereto.

Similarly, the fifth and sixth protection circuits 65 and 66 allow a voltage change on the communication paths P5 and P6 to be limited within the range of the power supply voltage Vdd2 for the sub microcomputer 30. Thus, even if power supply from the power supply circuit 40 is interrupted to the sub microcomputer 30, a current can be prevented from flowing from the level adjusting circuit 60 to the sub microcomputer 30 via the communication paths P5 and P6. This makes it possible to protect the components in the sub microcomputer 30 during power supply interruption thereto.

In addition, the seventh and eighth protection circuits 67 and 68 allow a voltage change on the communication paths P1 and P2 to be limited within the range of the power supply voltage Vcc2 for the bus transceiver 50. Thus, even if power supply from the power supply circuit 40 is interrupted to the bus transceiver 50, a current can be prevented from flowing from the level adjusting circuit 60 to the bus transceiver 50 via the communication paths P1 and P2. This makes it possible to protect the components in the bus transceiver 50 during power supply interruption thereto.

Next, operations of the ECU 2 will be described hereinafter with a focus on operations of the level adjusting circuit 60.

In the first embodiment, it is assumed that the main microcomputer 20 is higher in priority than the sub microcomputer 30.

For example, when the main microcomputer 20 wants to send data to the ECU 4 via the communication bus 10, the main microcomputer 20 executes the CAN communication program stored in the memory 22. The CAN communication program allows the main microcomputer 20 to transmit, bit-by-bit, a CAN message based on the data to the AND gate 62 via the fourth protection circuit 64 and the first buffer 70 in cooperation with the communication controller 25.

Similarly, when the sub microcomputer 30 wants to send data to the ECU 4 via the communication bus 10, the sub microcomputer 30 executes the CAN communication program stored in the memory 32. The CAN communication program allows the sub microcomputer 30 to transmit, bit-by-bit, a CAN message based on the data to the AND gate 62 via the fifth protection circuit 65 and the second buffer 80 in cooperation with the communication controller 35.

In this case, because the main microcomputer 20 is higher in priority than the sub microcomputer 30, the number of an identifier of the CAN message transmitted from the main microcomputer 20 is lower than that of an identifier of the CAN message transmitted from the sub microcomputer 30.

For example, in this case, the CAN message transmitted from the main microcomputer 20 has identifier 01101000110, whose number is 838, is lower than identifier 01101001000, whose number is 840, of the CAN message transmitted from the sub microcomputer 30. This means that the CAN message transmitted from the main microcomputer 20 is higher in priority than that transmitted from the sub microcomputer 30.

When the SOF bits of the CAN messages transmitted from the respective microcomputers 20 and 30 are simultaneously input to the AND gate 62, the AND gate 62 executes logical AND combination of the identifier of the CAN message transmitted from the main microcomputer 20 with that of the CAN message transmitted from the sub microcomputer 30 bit-by-bit.

Figure 3:
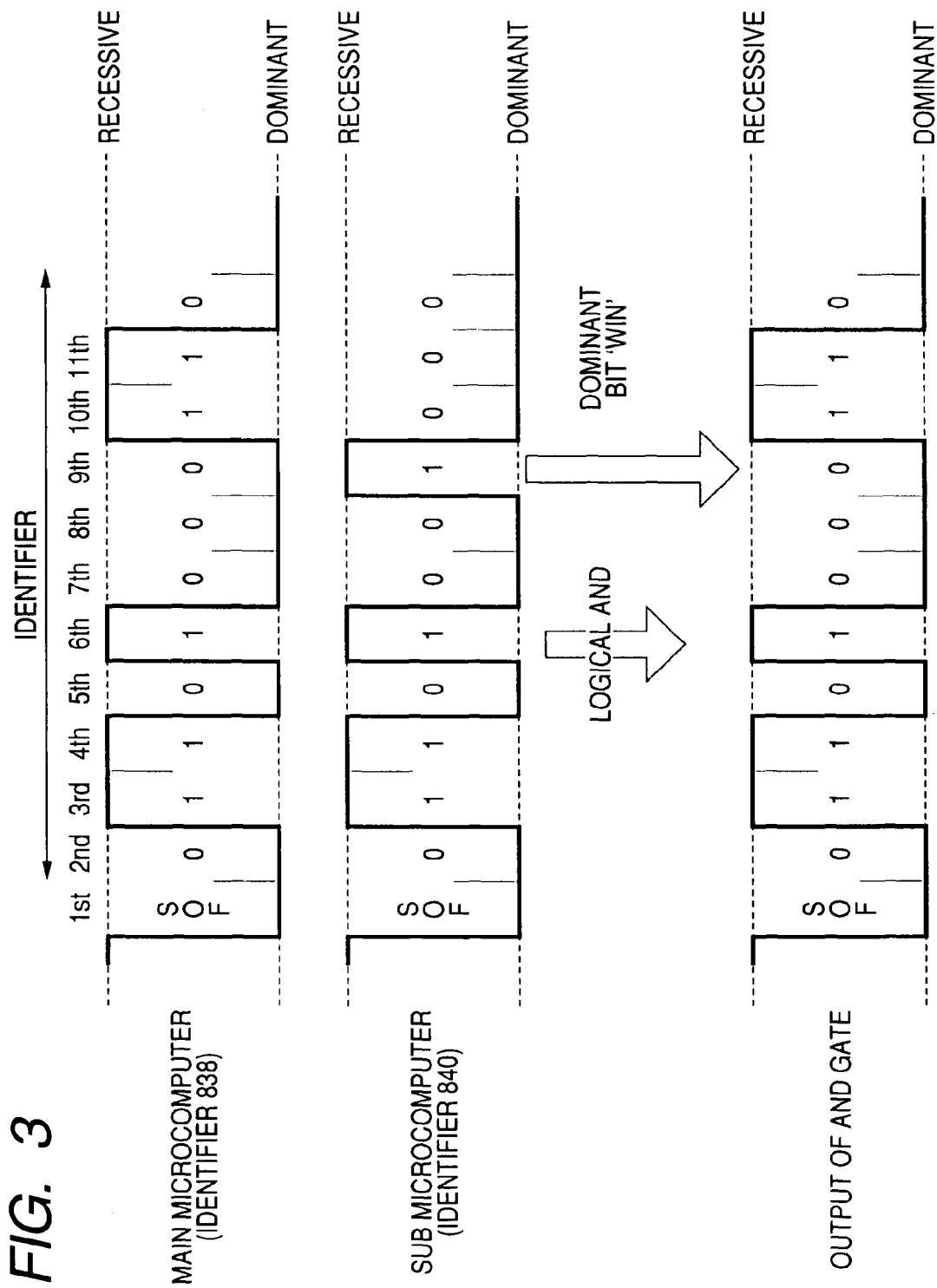
FIG. 3 is a timing chart schematically illustrating CAN communications via an AND gate illustrated in FIG. 1.

Specifically, because the first to eighth bits of the identifiers of the respective CAN messages are equal to each other, the same bits of the first to eight bits of each of the identifiers are sequentially output from the AND gate 62 (see FIG. 3). Thus, the monitor circuit 95 sends, to the communication circuits 25a and 35a of the main and sub microcomputers 20 and 30, the same bits of the corresponding CAN messages, respectively, as the monitor result of the first to eighth bits of the identifier of the output data from the AND gate 62.

Thereafter, the logical AND combination of the ninth bit of the identifier of the CAN message transmitted from the main microcomputer 20 and that of the identifier of the CAN message transmitted from the sub microcomputer 30 is carried out. In this case, because the ninth bit of the identifier of the main-microcomputer's CAN message is a dominant bit of "0" corresponding to the low level and the ninth bit of the identifier of the sub-microcomputer's CAN message is a recessive bit of "1" corresponding to the high level, the dominant bit of "0" wins. This causes the ninth bit of the identifier to be output from the AND gate 62 as a dominant bit of "0" corresponding to the low level (see FIG. 3).

Thus, the monitor circuit 95 sends, to the communication circuits 25a and 35a of the microcomputers 20 and 30, the dominant bit of "0" corresponding to the low level as the monitor result of the ninth bit of the identifier of the output data from the AND gate 62.

Figure 4A:
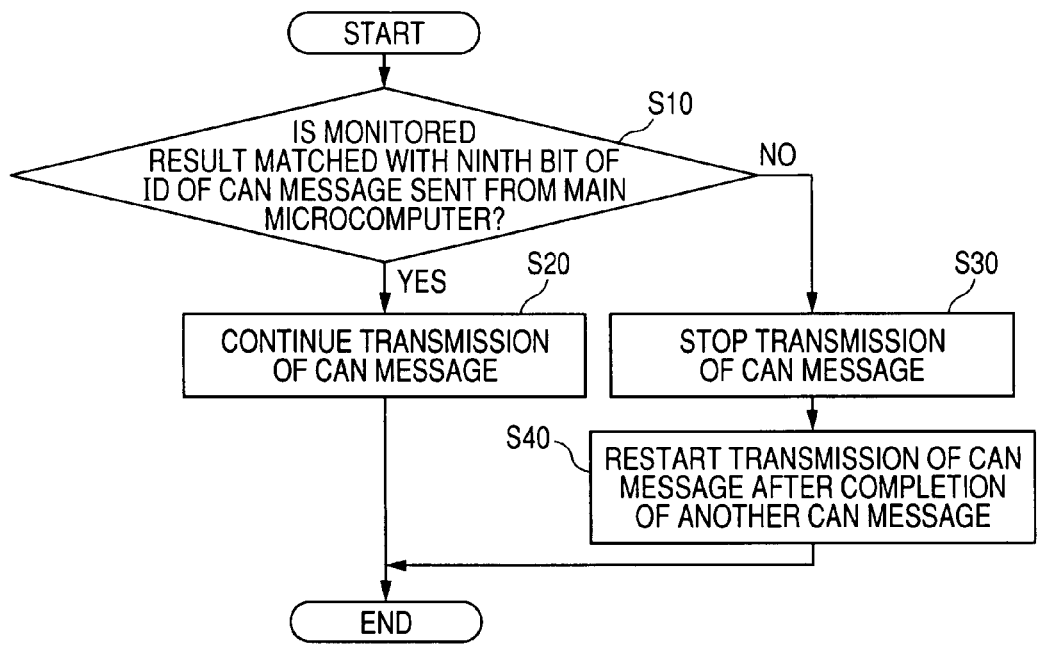
FIG. 4A is a flowchart schematically illustrating operations of the communication controller installed in a main microcomputer illustrated in FIG. 1.

When receiving the monitor result of the ninth bit of the identifier of the output CAN message, the communication circuit 25a (and/or the CPU 21) determines whether the monitor result of the ninth bit is matched with the ninth bit of the identifier of the CAN message transmitted therefrom in step S10 of FIG. 4A.

In this case, the monitor result of the ninth bit (dominant bit of "0" corresponding to the low level) is matched with the ninth bit (dominant bit of "0" corresponding to the low level) of the identifier of the CAN message transmitted from the main microcomputer 20 (the determination in step S10 is YES). For this reason, the communication circuit 25a (and/or the CPU 21) continues transmission of the corresponding CAN message in step S20, so that the CAN message transmitted from the main microcomputer 20 is output from the AND gate 62 to the bus transceiver 50 through the third buffer 90.

The bus transceiver 50 sequentially receives the individual bits of the CAN message transmitted from the main microcomputer 20 via the level adjusting circuit 60. The bus transceiver 50 sequentially generates the first different voltage (dominant level) between the CAN_H and the CAN_L of the communication bus 10 when a received bit is dominant bit of "0" or the second different voltage (recessive level) therebetween when a received bit is recessive bit of "1".

Accordingly, the main microcomputer 20 can transfer the CAN message to the ECU 4 via the communication bus 10 in the same manner as in the case where the main microcomputer 20 is directly coupled to the communication bus 10 via the bus transceiver 50.

It is to be noted that, though not identical with the first embodiment, when the monitor result of the ninth bit is mismatched with the ninth bit of the identifier of the CAN message transmitted from the main microcomputer 20 (the determination in step S20 is NO), the communication circuit 25a (and/or the CPU 21) stops transmission of the corresponding CAN message and waits until transmission of another CAN message from another circuit to the AND gate 62 is completed in step S30. After in step S30, when determining that the transmission of the CAN message from another circuit is completed based on the monitor result output from the monitor circuit 95, the communication circuit 25a (and/or the CPU 21) restarts transmission of the corresponding CAN message to the AND gate 62 in step S40.

Figure 4B:
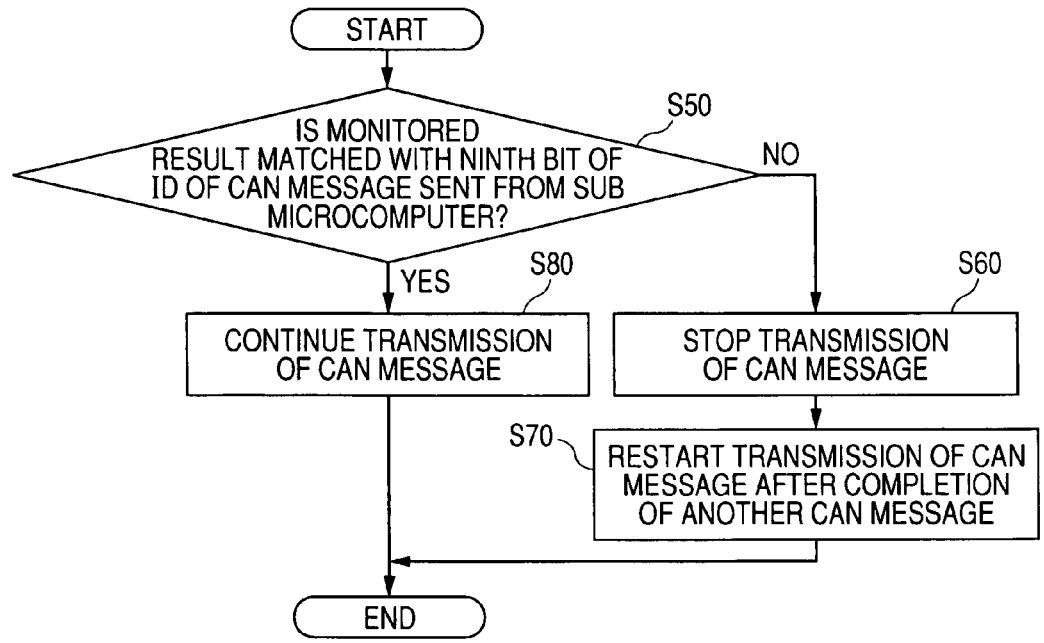
FIG. 4B is a flowchart schematically illustrating operations of the communication controller installed in a sub microcomputer illustrated in FIG. 1.

In contrast, when receiving the monitor result of the ninth bit, the communication circuit 35a (and/or the CPU 31) determines whether the monitor result of the ninth bit is matched with the ninth bit of the identifier of the CAN message transmitted from the sub microcomputer 30 in step S50 of FIG. 4B.

In this case, the monitor result of the ninth bit (dominant bit of "0" corresponding to the low level) is mismatched with the ninth bit (recessive bit of "1" corresponding to the high level) of the identifier of the CAN message transmitted from the sub microcomputer 30 (the determination in step S50 is NO). For this reason, the communication circuit 35a (and/or the CPU 31) stops transmission of the corresponding CAN message and waits until the transmission of the CAN message from the main microcomputer 20 to the AND gate 62 is completed in step S60.

After in step S60, when determining that the transmission of the CAN message from the main microcomputer 20 is completed based on the monitor result output from the monitor circuit 95, the communication circuit 35a (and/or the CPU 31) restarts transmission of the corresponding CAN message to the AND gate 62 in step S70.

In this case, because no CAN messages are output from the microcomputer 20, the CAN message transmitted from the sub microcomputer 30 is output from the AND gate 62 to the CAN transceiver 50 through the third buffer 90.

It is to be noted that, though not identical with the first embodiment, when the monitor result of the ninth bit is matched with the ninth bit of the identifier of the CAN message transmitted from the sub microcomputer 30 (the determination in step S50 is YES), the communication circuit 35a (and/or the CPU 31) continues transmission of the corresponding CAN message in step S80.

The bus transceiver 50 sequentially receives the individual bits of the CAN message transmitted from the sub microcomputer 30 via the level adjusting circuit 60. The bus transceiver 50 sequentially generates the first different voltage (dominant level) between the CAN_H and the CAN_L of the communication bus 10 when a received bit is dominant bit of "0" or the second different voltage (recessive level) therebetween when a received bit is recessive bit of "1".

Accordingly, the sub microcomputer 30 can transfer the CAN message to the ECU 4 via the communication bus 10 in the same manner as in the case where the sub microcomputer 30 is directly coupled to the communication bus 10 via the bus transceiver 50.

In addition, when one of the external devices, such as the ECU 6, wants to send data to the sub microcomputer 30, the ECU 6 transmits a CAN message to the sub microcomputer 30. The CAN message is transferred, to the bus transceiver 50, via the communication bus 10 as dominant and recessive levels respectively corresponding to the dominant and recessive bits of the CAN message.

The bus transceiver 50 sequentially converts the dominant and recessive levels as the CAN message into dominant and recessive bits of the CAN message, respectively. Thereafter, the bus transceiver 50 distributes the CAN message to both the main and sub microcomputers 20 and 30 via the level adjusting circuit 60.

Specifically, the bus transceiver 50 sequentially transfers the individual bits of the CAN message transmitted from the ECU 6 to both the main and sub microcomputers 20 and 30 via the third buffer 90 and the first and second buffers 70 and 80.

This results in that the CAN message transmitted from one of the external devices, such as the ECU 6, can be transferred to not only the sub microcomputer 30 as the target of the CAN message but also the main microcomputer 20.

It is to be noted that, for example, target of a CAN message to be transmitted from one of the main and sub microcomputers 20 and 30 can be set to the other of the main and sub microcomputers 20 and 30. In this case, after the CAN message is transferred through the communication bus 10, the CAN message is returned from the communication bus 10 to be transferred to the other of the main and sub microcomputers 20 and 30 via the communication converter 50 and the level adjusting circuit 60.

As described above, in the integrated ECU 2 in which the main and sub microcomputers 20 and 30 are installed, it is possible to share the bus transceiver 50 among the main and sub microcomputers 20 and 30 without using a communication arbitration circuit.

Specifically, in the integrated ECU 2, even if CAN messages are simultaneously transmitted from the main and sub microcomputers 20 and 30 toward the shared communication controller 50, the level adjusting circuit 60 provided between the bus transceiver 50 and the microcomputers 20 and 30 just carries out logical AND combination of the input CAN messages bit-by-bit. This makes it possible to:

continue transmission of one of the CAN messages that is higher in priority than the other thereof;

cause a communication controller corresponding to the lower-priority CAN message to stop transmission of the lower-priority CAN message and to wait until the transmission of the higher-priority CAN message to the level adjusting circuit 60 is completed; and restart transmission of the lower-priority CAN message to the level adjusting circuit 60 after completion of the transmission of the higher-priority CAN message.

Thus, it is possible to transfer, to the shared bus transceiver 50, the CAN messages simultaneously transmitted from the main and sub microcomputers 20 and 30 based on the priorities of the CAN messages without utilizing such a conventional arbitration circuit designed to:

hold the higher-priority CAN message and the lower-priority CAN message; and sequentially output the higher-priority CAN message and the lower-priority CAN message to the bus transceiver 50.

It is therefore unnecessary for the ECU 2 to:

provide a storage area for storing therein the CAN messages simultaneously transmitted from the main and sub microcomputers 20 and 30; and carry out signal processing to hold the CAN messages in the storage area and to sequentially output the stored CAN messages to the bus transceiver 50.

Moreover, the main and sub microcomputers 20 and 30 can transfer CAN message to the external devices coupled to the communication bus 10 in the same manner as in the case where the main and sub microcomputers 20 and 30 are directly coupled to the communication bus 10 via the bus transceiver 50.

Specifically, it is unnecessary to alter the CAN communication program (CAN communication procedures) of each of the main and sub microcomputers 20 and 30 in response to the intervening level adjusting circuit 60 between the bus transceiver 50 and each of the microcomputers 20 and 30.

This therefore allows the configuration of the integrated ECU 2 to be simplified and the cost thereof to be reduced.

It is to be noted that, as described above, a plurality of ECUs installed in a vehicle have different functions, respectively. For this reason, the operating times of the ECUs are individually determined depending on the respective functions.

For example, as the main microcomputer 20, a microcomputer that should be active at all times can be used. Similarly, as the sub microcomputer 30, a microcomputer whose operating time should be changed depending on the vehicle operating conditions controllable by the location of an ignition key of the vehicle being inserted in the key cylinder thereof, such as the ignition position, the off position, the accessory position, and the starter position. It is to be noted that the ignition switch 18 is turned on when the location of the ignition key being inserted in the key cylinder is shifted to the ignition position by the driver.

As described above, when the main microcomputer 20 and the sub microcomputer 30 are different from each other in operating time, a time period over which the power supply voltage is supplied can be set by the power control circuit 45 for each of the main and sub microcomputers 20 and 30.

When the time periods over which the power supply voltages are supplied for the respective main and sub microcomputers 20 and 30 are set to be different from each other, while the level adjusting circuit 60 is inactive, power supply from the regulator 42 to one of the main and sub microcomputers 20 and 30 may be interrupted.

For example, it is assumed that, while the level adjusting circuit 60 is in active, power supply from the regulator 42 to the sub microcomputer 30 may be interrupted.

In this assumption, the fifth and sixth protection circuits 65 and 66 being subjected to the power supply voltage Vdd2 for the sub microcomputer 30 allow a voltage change on the communication paths P5 and P6 for the sub microcomputer 30 to be limited within the range of the power supply voltage Vdd2. This prevents a current from flowing from the level adjusting circuit 60 to the sub microcomputer 30, making it possible to protect the components in the sub microcomputer 30.

The eleventh and twelfth protection circuits 36 and 37 have substantially the same functions as those of the fifth and sixth protection circuits 65 and 66. For this reason, it is possible to protect the components in the sub microcomputer 30.

Similarly, when, while the level adjusting circuit 60 is in active, power supply from the regulator 43 to the main microcomputer 20 may be interrupted, the third and fourth protection circuits 63 and 64 being subjected to the power supply voltage Vdd1 for the main microcomputer 20 allow a voltage change on the communication paths P3 and P4 for the main microcomputer 20 to be limited within the range of the power supply voltage Vdd1. This prevents a current from flowing from the level adjusting circuit 60 to the main microcomputer 20, making it possible to protect the components in the main microcomputer 20.

The ninth and tenth protection circuits 26 and 27 have substantially the same functions as those of the third and fourth protection circuits 63 and 64. For this reason, it is possible to protect the components in the main microcomputer 20.

As in the case of the relationship between the level adjusting circuit 60 and each of the main and sub microcomputers 20 and 30, the first, second, seventh, and eighth protection circuits 51, 56, 67, and 68 can protect the components of the bus transceiver 50.

Furthermore, in the first embodiment, the level lock circuits 76, 86, and 96 are provided in the first, second, and third buffers 70, 80, and 90, respectively. The level lock circuits 76, 86, and 96 are connected via the respective first, second, and third terminals T1, T2, and T2 to at least one of external units of, for example, the power control circuit 45, the main microcomputer 20, the sub microcomputer 30, and the power supply lines PL1, PL2, and PL4.

Each of the level lock circuits 76, 86, and 96 works to disable corresponding communication routes via a corresponding one of the first, second, and third buffers 70, 80, and 90 when a disabling control signal is input thereto via a corresponding one input terminal from the at least one of the external units.

For example, when power supply to the main microcomputer 20 is controlled by the power control circuit 45 so that the main microcomputer 20 changes in its operational state from normal state to sleep state or standby state, the main microcomputer 20 sends, to the level adjusting circuit 60, the disabling control signal during the operational state changing task (see reference character CS1 expressed by dashed lines in FIG. 1).

When receiving the disabling control signal, the level lock circuit 76 corresponding to the main microcomputer 20 locks output levels of its corresponding line buffers to the predetermined high level corresponding to the recessive level on the communication bus 10.

This makes it possible to disable the communication routes between the level adjusting circuit 60 and the main microcomputer 20, thereby:

preventing noise from entering into the level adjusting circuit 60 from the main microcomputer 20; and ensuring communications between the normally operated sub microcomputer 30 and the bus transceiver 50 via the level adjusting circuit 60.

Similarly, when the sub microcomputer 30 changes in its operational state from normal state to sleep state or standby state, the disabling control signal is sent to the level adjusting circuit 60 (see reference character CS2 expressed by dashed lines in FIG. 1). This allows each of the level lock circuits 86 and 96 corresponding to the sub microcomputer 30 to lock output levels of its corresponding line buffers to the predetermined high level corresponding to the recessive level on the communication bus 10.

This makes it possible to disable the communication routes between the bus transceiver 50 and the sub microcomputer 30 via the level adjusting circuit 60, thereby:

preventing noise from entering into the level adjusting circuit 60 from each of the circuits 30 and 50; and ensuring communications between the normally operated main microcomputer 20 and the bus transceiver 50.

In addition, when power supply from the buttery 16 to the bus transceiver 50 is interrupted, the disabling control signal is sent from the power control circuit 45 or at least one of the power supply lines PL1 to PL3 to the level adjusting circuit 60 (see reference characters CS3 expressed by dashed lines in FIG. 1).

This allows each of the level lock circuits 76, 86 and 96 to lock output levels of its corresponding line buffers to the predetermined high level corresponding to the recessive level on the communication bus 10.

This makes it possible to disable the communication routes between the inactive bus transceiver 50 and each of the main and sub microcomputers 20 and 30 via the level adjusting circuit 60. The disabling of the communication routes between the inactive bus transceiver 50 and each of the main and sub microcomputers 20 and 30 allows noise to enter from the inactive bus transceiver 50 to each of the microcomputers 20 and 30, making it possible to prevent the microcomputers 20 and 30 from malfunctioning.

As described above, each of the level lock circuits 76, 86 and 96 is configured to lock output levels of its corresponding line buffers to the predetermined high level corresponding to the recessive level on the communication bus 10 to disable corresponding communication routes without using expensive switches. For this reason, it is possible to simply implement disabling means for communication routes at low cost.

In addition, in the first embodiment, when the main microcomputer 20 changes in its operational state from normal state to sleep state or standby state, the level lock circuit 76 recognizes that a disabling condition for the main microcomputer 20 has been satisfied based on the disabling control signal sent from the main microcomputer 20. The level lock circuit 76 therefore locks output levels of its corresponding line buffers 72 and 74 to the predetermined high level corresponding to the recessive level on the communication bus 10, thereby disabling the communication routes for the main microcomputer 20.

In this case, it is preferable that the level lock circuit 76 keeps the level-lock state until an enabling control signal is sent from the main microcomputer 20 to the level lock circuit 76. The reason is described as follows.

Specifically, after the communication routes between the level adjusting circuit 60 and the main microcomputer 20 are disabled, while the normally active sub microcomputer 30 communicates with an external device on the communication bus 10 via the bus transceiver 50, it is possible prevent the level-lock state from being released due to any disturbance. This allows the normally active sub microcomputer 30 to continuously carry out communications with the external device via the bus transceiver 50 with little influence from the communication routes between the main microcomputer 20 and the level adjusting circuit 60.

The level-lock keeping feature set forth above can be similarly established for the level lock circuits 86 and 96.

In the first embodiment, when the ignition switch 18 is turned off by the ignition-key operation of the driver, the power control circuit 45 works to interrupt power supply to the main microcomputer 20, the sub microcomputer 30, and the bus transceiver 50 via the corresponding regulators 41, 42, and 44. The power supply interrupt allows communication routes between the level adjusting circuit 60 and each of the communication target circuits 20, 30, and 50 to be disabled.

In the first embodiment, when a signal requesting disable of communication routes between the level adjusting circuit 60 and a target circuit is input from a key switch installed in the vehicle and operated by the driver, from a communication target circuit 20, 30, or 50 or an external device, the power control circuit 45 can work to interrupt power supply to the communication circuit via the corresponding regulator.

Moreover, the power supply circuit 45 can be operative to:

monitor a watchdog pulse periodically output from a communication target circuit; and when it does not receive a watchdog pulse within a preset period of time from the communication target circuit, output, the signal requesting disable of communication routes between the level adjusting circuit 60 and the communication target circuit.

In the first embodiment, the third regulator 43 works to continuously supply power to the level adjusting circuit 60 while at least one of the circuits 20, 30, and 50 coupled to the circuit 60. This allows at least one of the circuits 20, 30, and 50 to be stable operable, making it possible to increase the reliability of the ECU 2.

It is preferable that the third regulator 43 works to supply power to the level adjusting circuit 60 all the times.

Second Embodiment

An ECU 2A according to a second embodiment of the present invention will be described hereinafter.

Like reference characters are assigned to like parts in the ECUs according to the first and second embodiments.

Descriptions of the like parts of the ECU according to the second embodiment will be therefore omitted, and different parts of the ECU according to the second embodiment from those according to the first embodiment will be described in detail hereinafter.

Figure 5:
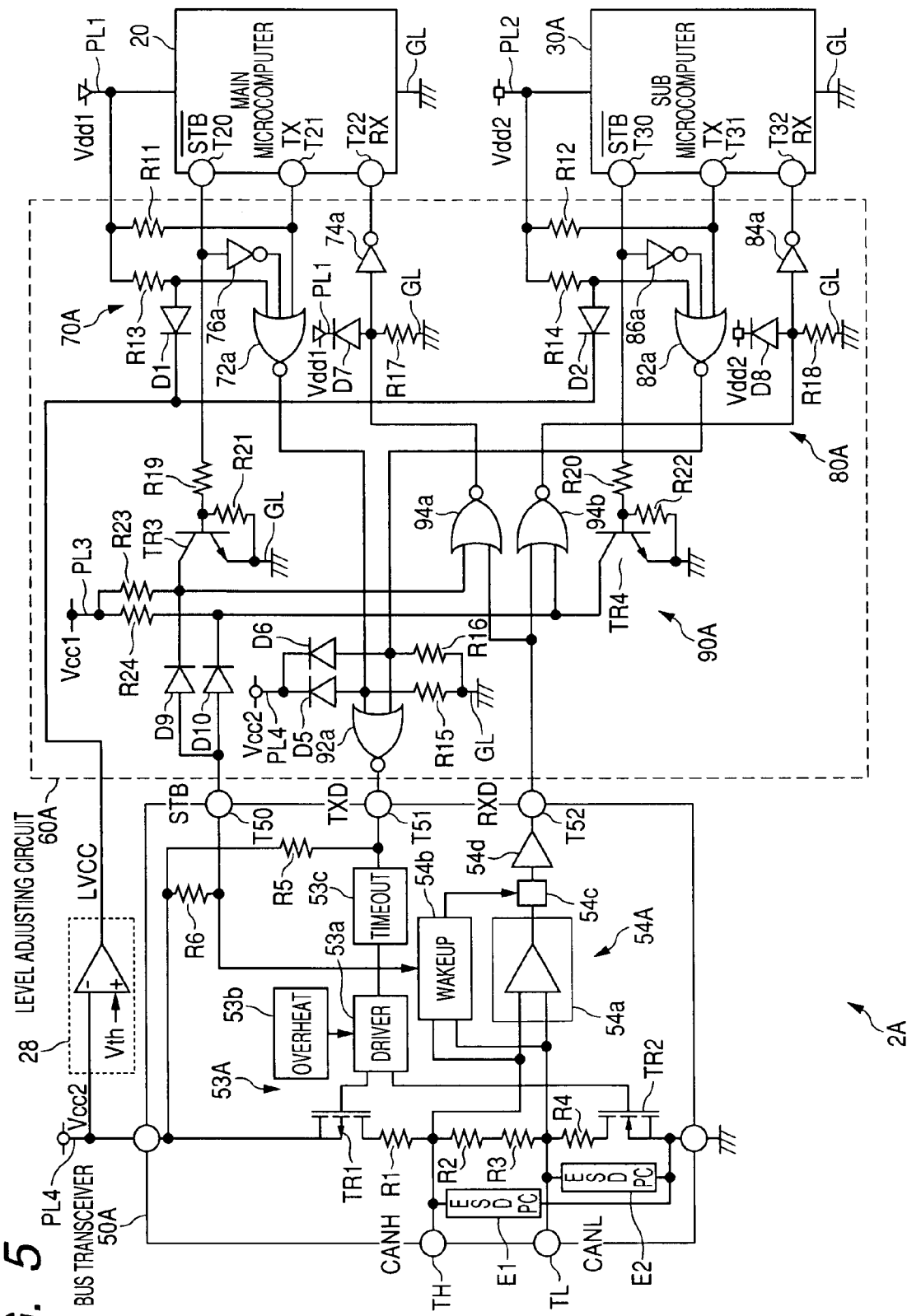
FIG. 5 is a block diagram schematically illustrating electrical configurations of an ECU according to a second embodiment of the present invention.

FIG. 5 schematically illustrates electrical configurations of a bus transceiver 50A and a level adjusting circuit 60A according to the second embodiment of the present invention.

As illustrated in FIG. 5, the bus transceiver 50A and the level adjusting circuit 60A are used to be installed in a vehicle together with a main microcomputer 20A, a sub microcomputer 30A, and the power supply circuit 40 (not shown in FIG. 5).

Like the first embodiment, the bus transceiver 50A is communicably coupled to the CAN_H and the CAN_L of the communication bus 10, and to the main and sub microcomputers 20A and 30A through communication routes. The bus transceiver 50A is operative to allow communications between the main and sub microcomputers 20 and 30 and the other devices on the communication bus 10 such that the dominant level on the communication bus 10 corresponds to a dominant bit of "0" having the low voltage.

As in the case of the first embodiment, the level adjusting circuit 60A is provided on the communication routes between each of the communication controllers (main and sub microcomputers 20A and 30A) and the bus transceiver 50A.

Specifically, the bus transceiver 50A is provided with pins T50, T51, T52, TH, and TL. The pins T50 to T52 are connected to the level adjusting circuit 60A, and the pins TH and TL are connected to the CAN_H and CAN_L of the communication bus 10.

The bus transceiver 50A includes a driver 53A operative to sequentially transmit a CAN message input from the level adjusting circuit 60A via the pin T51 to the communication bus 10 via the pins TH and TL.

Specifically, the driver 53A is composed of resistors R1 to R4, first and second switching transistors, such as P- and N-channel MOSFETs, TR1 and TR2, a gate driver 53a. The source of the first switching transistor TR1 is connected to the power supply line PL4, and the gate thereof is connected to the gate driver 53a. The drain of the first switching transistor TR1 is connected to one end of the resistor R1. The resistors R1 to R4 are connected in series to each other so that the one end of the resistor R1 serves as one end of the series-connected resistors R1 to R4.

The other end of the series-connected resistors R1 to R4 is connected to the drain of the second switching transistor TR2. The gate of the second switching transistor TR2 is connected to the gate driver 53a, and the source thereof is connected to the ground line GL.

The gate driver 53a is connected to the pin T51, via a timeout circuit 53c.

The connecting point between the resistors R1 and R2 is connected to the CAN_H via the pin TH, and the connecting point between the third and fourth resistors R3 and R4 is connected to the CAN_L via the pin TL.

The resistors R1 to R4 are operative to divide the power supply voltage Vcc2 supplied from the power supply circuit 40. The gate driver 53a is operative to turn on each of the first and second transistors TR1 and TR2 when an input level (bit) of a CAN message TXD (Transmit data input to the bus transceiver 50A) being input to the bus transceiver 50A from the level adjusting circuit 60A via the pin T51 is the low level (dominant bit of "0").

Specifically, when an input level (bit) of a CAN message TXD being input to the bus transceiver 50A from the level adjusting circuit 60A via the pin T51 is the low level, the on state of each of the first and second transistors TR1 and TR2 allows the power line PL4 and the ground line GL to be conducted. This permits a voltage determined based on resistances of the resistors R1 to R4 to be applied between the CAN_H and CAN_L of the communication bus 10. Adjustment of the resistances of the first to fourth resistors R1 to R4 allows the voltage applied between the CAN_H and CAN_L to correspond to the dominant level of, for example, 2.0 V.

On the other hand, when an input level (bit) of the CAN message TXD being input to the bus transceiver 50A from the level adjusting circuit 60A via the pin T51 is the high level, each of the first and second switching transistors TR1 and TR2 is kept off. This causes the power line PL4 and the ground line GL not to be conducted, so that the CAN_H and CAN_L are terminated by the second and third resistors R2 and R3. Therefore, the second different voltage of 0 V between the CAN_H and the CAN_L is generated to correspond to the recessive level.

When no CAN messages are input to the bus transceiver 50A via the pin T51, a voltage difference between the CAN_H and CAN_L of the communication bus 10 becomes a voltage difference generated by the other ECUs 4, 6, ... coupled to the communication bus 10.

In addition, the bus transceiver 50A includes an overheat detection circuit 53b connected to the gate driver 53a. The overheat detection circuit 53b is located to allow detection of overheating of each of the first and second switching transistors TR1 and TR2. When detecting overheating of at least one of the first and second switching transistors TR1 and TR2, the overheat detection circuit 53b works to send an overheating detection signal to the gate driver 53a. In response to the overheating detection signal, the gate driver 53a turns off the at least one of the first and second switching transistors TR1 and TR2.

The timeout circuit 53c is operative to disable an input of CAM messages to the bus transceiver 50A from the level adjusting circuit 60A via the pin T51 after a predetermined period of time has elapsed since the last input of a CAN message.

The bus transceiver 50A includes a receiver 54A connected to the CAN_H and CAN_L via the respective pins TH and TL and operative to sequentially transmit a CAN message transferred via the communication bus 10 to the level adjusting circuit 60A.

Specifically, the receiver 54A is composed of a comparator 54a connected to the CAN_H and CAN_L via the respective pins TH and TL.

The comparator 54a works to:

generate a dominant bit (logical 0) having the low level when the first different voltage appears between the CAN_H and the CAN_L representing the "dominant level"; and generate a recessive bit (logical 1) having the high level when the second different voltage appears between the CAN_H and the CAN_L representing the "recessive level".

The receiver 54A is composed of a line buffer 54d. The line buffer 54d works to transmit the generated bits by the comparator 54a bit-by-bit to the level adjusting circuit 60A as a CAN message.

The bus transceiver 50A includes a wakeup circuit 54b and a switch 54c. The switch 54c is provided on a communication path between the comparator 54a and the line buffer 54d, and the wakeup circuit 54b is connected to each of the CAN_H and CAN_L of the communication bus 10 and to the switch 54c.

The wakeup circuit 54b is operative to turn on the switch 54c when a CAN message is input from the communication bus 10.

The bus transceiver 50A includes a resistor R6. The wakeup circuit 54b is connected to the pin T50 connected to the power supply line PL4 via the resistor R6.

Specifically, when an STB (Standby mode control input) signal to be input to the pin T50 from the level adjusting circuit 60A is high, the wakeup circuit 54b is in standby state (standby mode), which disables reception of the bus transceiver 50A. It is to be noted that the STB signal with the high level, which serves as an operation mode signal allowing the bus transceiver 50A to be in standby state, is configured to be output from the level adjusting circuit 60A.

The bus transceiver 50A includes a resistor R5. A communication path through which a CAN message is received from the level adjusting circuit 60A is connected to the power supply line PL4 via the resistor R5. Communication lines between the CAN_H and CAN_L and the receiver 54A are connected to the ground lines GL so that they are grounded.

The bus transceiver 50A includes ESD (Electro-Static Discharge) protection circuits E1 and E2 respectively connected to the ground lines and to communication paths connecting between the CAN_H and CAN_L and the comparator 54a. The ESD protection circuits E1 and E2 allow ESD surges generated on the communication paths to be immediately drawn to the ground line GL, making it possible to protect the transistors TR1 and TR2 from the ESD surges.

Next, the level adjusting circuit 60A is configured to:

invert bits (levels) of a CAN message input from at least one of the main microcomputer 20A, sub microcomputer 30A, and bus transceiver 50A; and transfer the inverted bits (levels) of the CAN message in the circuit 60A, thereby preventing dominant bits (low levels) from erroneously outputting from the level adjusting circuit 60A when a communication route from the circuit 60A to a corresponding target circuit is contacted to a ground line.

Specifically, the level adjusting circuit 60A is composed of a first buffer 70A, a second buffer 80A, a third buffer 90A, and a comparator 28. The main microcomputer 20A has pins T20 to T22, and the sub microcomputer 30A has pins T30 to T32.

The first buffer 70A includes a NOR gate 72a and an inverter 74a, and the second buffer 80A includes a NOR gate 82a and an inverter 84a. In addition, the third buffer 90A includes NOR gates 92a, 94a, and 94b. The NOR gate 72a has first to third input terminals and an output terminal, and the first input terminal is connected to the pin T21 of the main microcomputer 20A. Similarly, the NOR gate 82a has first to third input terminals and an output terminal, and the first input terminal is connected to the pin T31 of the sub microcomputer 30A.

The NOR gate 92a has a pair of input terminals and an output terminal. One of the paired input terminals is connected to the output terminal of the NOR gate 72a, and the other thereof is connected to the output terminal of the NOR gate 82a. The output terminal of the NOR gate 92a is connected to the pin T51 of the bus transceiver 50A.

Each of the NOR gates 94a and 94b has a pair of input terminals and an output terminal. One of the input terminals of the NOR gate 94a and one of the input terminals of the NOR gate 94b are joined to be connected to the pin T52 of the bus transceiver 50A. The output terminal of the NOR gate 94a is connected to the pin T22 of the main microcomputer 20A via the inverter 74a. Similarly, the output terminal of the NOR gate 94b is connected to the pin T32 via the inverter 84a. Specifically, the pins T22 and T32 serve as receive data (receive CAN messages) pins of the main and sub microcomputers 20A and 30A, respectively.

Specifically, when a CAN message TX (Transmit data) is transmitted from the main microcomputer 20A via the pin T21, the CAN message TX is configured to be input to the level adjusting circuit 60A through the NOR gate 72a. Similarly, when a CAN message (TX) is transmitted from the sub microcomputer 30A via the pin T31, the CAN message TX is configured to be input to the level adjusting circuit 60A through the NOR gate 82a. The input CAN messages TX transmitted from the main and sub microcomputers 20A and 30A are transferred via respective communication routes in the level adjusting circuit 60A to be input to the NOR gate 92a.

The CAN messages TX transmitted from the main and sub microcomputers 20A and 30A are combined with each other by the NOR gate 92a, and combined data (CAN message) is output to the bus transceiver 50A via the pin T51.

On the other hand, when a CAN message RXD (Receive data output from the communication bus 10) is transmitted from the bus transceiver 50A to be input to the level adjusting circuit 60A via the pin T52, the CAN message RXD is distributed to be input to the NOR gates 94a and 94b. One of the distributed CAN messages RXD is transferred to the main microcomputer 20A through the inverter 74a and the pin T22, and the other thereof is transferred to the sub microcomputer 30A through the inverter 84a and the pin T32.

Therefore, when a recessive bit (logical 1) with the high level is transmitted from the main microcomputer 20A to be input to the NOR gate 72a, the recessive bit is converted by the NOR gate 72a independently of another input thereto. This results in that a dominant bit (logical 0) with the low level is transferred and input to the NOR gate 92a.

Similarly, when a recessive bit (logical 1) with the high level is transmitted from the sub microcomputer 30A to be input to the NOR gate 82a, the recessive bit is converted by the NOR gate 82a independently of another input thereto. This results in that a dominant bit (logical 0) with the low level is transferred to be input to the NOR gate 92a.

When the converted dominant bits are simultaneously input to the NOR gate 92a, a recessive bit (logical 1) is output from the NOR gate 92a to the bus transceiver 50A.

In addition, when a recessive bit (logical 1) with the high level is transmitted from the bus transceiver 50A to be input to the level adjusting circuit 60A via the pin T52, the recessive bit is distributed to be input to both the NOR gates 94a and 94b.

When one of the distributed recessive bits is input to the NOR gate 94a, a dominant bit (logical 0) is output from the NOR gate 94a independently of another input thereto so that the dominant bit with the low level is input to the inverter 74a. This allows the dominant bit to be inverted by the inverter 74a, and the inverted recessive bit (logical 1) is transferred to the main microcomputer 20A as receive data RX.

On the other hand, when the other of the distributed recessive bits is input to the NOR gate 94b, a dominant bit (logical 0) is output from the NOR gate 94b independently of another input thereto so that the dominant bit with the low level is input to the inverter 84a. This allows the dominant bit to be inverted by the inverter 84a, and the inverted recessive bit (logical 1) is transferred to the sub microcomputer 30A.

As described above, when a recessive bit with the high level of a CAN message is input to the level adjusting circuit 60A from at least one of the circuits 20A, 30A, and 50A, the high level of the recessive bit is inverted by the level adjusting circuit 60A to the low level of the dominant bit. Then, the dominant bit with the inverted low level is transferred in the level adjusting circuit 60A.

As well as the first embodiment, when the SOF bits of CAN messages sent from the main and sub microcomputers 20A and 30A are simultaneously input to the level adjusting circuit 60A, the CAN messages are merged with each other bit-by-bit.

Specifically, when a dominant bit (low level) of a CAN message is input to the NOR gate 72a from the main microcomputer 20A, a recessive bit (high level) is output therefrom to be input to the NOR gate 92a. Similarly, when a dominant bit (low level) of a CAN message is input to the NOR gate 82a from the sub microcomputer 30A, a recessive bit (high level) is output therefrom to be input to the NOR gate 92a.

The recessive bits (logical 1) are subjected to logical NOR operation by the NOR 92a so that a dominant bit (low level), which is the same as the original input bit (level) from each of the microcomputers 20A and 30A, is output from the NOR 92a.

In this case, if a recessive bit (high level) of a CAN message is input to the NOR gate 82a from the sub microcomputer 30A, a dominant bit (low level) is output therefrom to be input to the NOR gate 92a.

The input recessive bit (logical 1) and the input dominant bit (logical 0) are subjected to logical NOR operation by the NOR gate 92a. Because the input recessive bit (logical 1) is given priory over the input dominant bit (logical 0) in the logical NOR operation, a dominant bit corresponding to the input recessive bit with high priority is output from the NOR gate 92a. The output bit is equivalent to the original input bit (level) from the higher-priority microcomputer 20A, is output from the NOR 92a.

As a result, a dominant bit of the CAN message output from the higher-priority circuit 20A wins with a recessive bit of the CAN message output from the lower-priority circuit 30A.

That is, the logical AND combination described in the first embodiment can be established by the NOR gates 72a, 82a, and 92a.

Moreover, it is assumed that a communication route (conductive lead path) between the second buffer 82a and the third buffer 92a is contacted to a ground line GL to be grounded so that the level of the communication route is in the low level. This causes an input bit via the communication route to/from the sub microcomputer 30A to be constantly "0" (low level).

In this assumption, a dominant bit (low level) of the CAN message output from the higher-priority circuit 20A is transferred in the level adjusting circuit 60A as an inverted recessive bit with the high level, so that the inverted recessive bit and the input bit with the low level are subjected to logical NOR operation by the NOR gate 92a. This results in that a dominant bit (low level), which is the same as the original input bit (level) from the higher-priority microcomputer 20A, is kept to be output from the NOR 92a.

In addition, in this assumption, a recessive bit (high level) of the CAN message output from the higher-priority circuit 20A is transferred in the level adjusting circuit 60A as an inverted dominant bit with the low level. The inverted dominant bit and the input bit with the low level are subjected to logical NOR operation by the NOR gate 92a. This results in that a recessive bit (high level), which is the same as the original input bit (level) from the higher-priority microcomputer 20A, is kept to be output from the NOR 92a.

That is, the level adjusting circuit 60A of this second embodiment allows an input bit with a level of a CAN message transmitted from the main microcomputer 20A to be output therefrom without change in level even though a communication route between the NOR gates 82a and 92a for the sub microcomputer 30A is contacted to a ground line GL.

This can be established for the sub microcomputer 30A even though a communication route between the NOR gates 72a and 92a for the main microcomputer 20A is contacted to a ground line GL.

On the other hand, when a dominant bit (low level) of a CAN message is input to the level adjusting circuit 60A from the bus transceiver 50A, the dominant bit is distributed to be input to each of the NOR gates 94a and 94b.

By each of the NOR gates 94a and 94b, the dominant bit is inverted in level to a recessive bit with the high level, and the recessive bit (high level) is output therefrom to be input to each of the NOT gates 74a and 84a.

By each of the NOT gates 74a and 84a, the recessive bit is inverted in level again, so that a dominant bit (low level), which is the same as the original input bit (level) from the bus transceiver 50A, is output therefrom to be transferred to a target circuit, such as the main microcomputer 20A or the sub microcomputer 30A.

In this case, it is assumed that a communication route (conductive lead path) between the second buffer 82a and the third buffer 92a is and the third buffer 90A can be disposed close to or installed in the respective circuits 20A, 30A, and 50A, and the buffers 70A, 80A, and 90A can be coupled to each other via comparatively long communication routes (conductive lead paths).

This is because, as described above, even if one of the communication routes is contacted to a ground line GL, it is possible to continue communications via another one of the communication routes with little influence from the grounding of the one of the communication routes.

On the other hand, each of the main and sub microcomputers 20A and 30A is programmed to, when changing its operational state (operational mode) from normal state to standby state or sleep state, generate an STB signal with the low level and send it to the level adjusting circuit 60A via a corresponding of the pins T20 and T30. The STB signal with the low level will be referred to as "$\overline{STB}$ signal" hereinafter to distinguish the STB signal with the high level.

The $\overline{STB}$ signal sent from each of the microcomputers 20A and 30A is input to the level adjusting circuit 60A.

Moreover, the power supply line PL1 is connected to the NOR gate 72a of the main microcomputer 20A via a resistor R13 as the second input terminal of the NOR gate 72a.

Similarly, the power supply line PL2 is connected to the NOR gate 82a of the sub microcomputer 30A via a resistor R14 as the second input terminal of the NOR gate 82a.

The power supply voltages Vdd1 and Vdd2 to be supplied from the power supply circuit 40 to the respective main and sub microcomputers contacted to a ground line GL to be grounded so that the level of the communication route is in the low level. This causes an input bit via the communication route to/from the sub microcomputer 30A to be constantly "0" (low level).

In this assumption, the NOT gate 84a mounted on the grounded communication route allows a recessive bit (high level) to be constantly output to the sub microcomputer 30A independently of an input level of a bit of a CAN message input to the level adjusting circuit 60A.

For this reason, it is possible for the level adjusting circuit 60A and the main microcomputer 20A to continue communications with each other via the communication routes therebetween with little influence from the grounding of a communication route between the NOR gates 82a and 92a.

This can be established for communications between the level adjusting circuit 60A and the sub microcomputer 30A even though a communication route between the NOR gates 72a and 92a for the main microcomputer 20A is contacted to a ground line GL.

As described above, the level adjusting circuit 60A according to the second embodiment can be configured such that:

the first buffer 70A consisting essentially of the NOR gate 72a and the inverter 74a, the second buffer 80A consisting essentially of the NOR gate 82a and the inverter 84a, and the third buffer 90A consisting essentially of the NOR gates 92a and 94a are distributedly arranged for the main microcomputer 20A, the sub microcomputer 30A, and the bus transceiver 50A, respectively.

In the arrangement, the first buffer 70A, the second buffer 80A, 20A and 30A are also input to the respective NOR gates 72a and 82a of the level adjusting circuit 60A as the disabling control signal.

The comparator 28 has a pair of input terminals and an output terminal, one of the paired input terminals is connected to the power supply line PL4, and the output terminal is connected to the level adjusting circuit 60A. A predetermined voltage level (threshold level) Vth is constantly applied to the other of the paired input terminals of the comparator 28.

The comparator 28 serves as a power supply monitor circuit for monitoring whether the power supply voltage Vcc2 to be supplied to the level adjusting circuit 60A is normal.

Specifically, the comparator 28 is configured to compare the power supply voltage Vcc2 for the bus transceiver 50A with the threshold voltage Vth, and to output a signal LVCC to the level adjusting circuit 60A.

In the second embodiment, the comparator 28 works to output the signal LVCC with the low level indicative of normal state when the power supply voltage Vcc2 is higher than the threshold voltage Vth.

In contrast, when the power supply voltage Vcc2 is abnormally lower than the threshold voltage Vth, the comparator 28 works to output the signal LVCC with the low level as the disabling control signal when the power supply voltage Vcc2 is higher than the threshold voltage Vth.

A communication path from the output terminal of the comparator 28 is separated into two communication paths. One of the communication paths is connected via a diode D1 to a connection path between the second input terminal of the NOR gate 72a and the resistor R13 of the power supply line PL1 via a diode D1. The other of the communication paths is connected via a diode D2 to a connection path between the second input terminal of the NOR gate 82a and the resistor R14 of the power supply line PL2.

Specifically, a connection point between the anode of the diode D1 and the resistor R13 is connected to the second input terminal of the NOR gate 72a. Similarly, a connection point between the anode of the diode D2 and the resistor R14 is connected to the second input terminal of the NOR gate 82a.

The configuration of the communication route between the comparator 28 and the NOR gate 72a allows the second input terminal of the NOR gate 72a to be:

low when the power supply voltage Vcc2 is normally supplied to the bus transceiver 50A so that the signal LVCC output from the comparator 28 is low; and high when the power supply voltage Vcc2 is not supplied to the bus transceiver 50A so that the signal LVCC output from the comparator 28 is high.

Similarly, the configuration of the communication route between the comparator 28 and the NOR gate 82a allows the second input terminal of the NOR gate 82a to be:

low when the power supply voltage Vcc2 is normally supplied to the bus transceiver 50A so that the signal LVCC output from the comparator 28 is low; and high when the power supply voltage Vcc2 is not supplied to the bus transceiver 50A so that the signal LVCC output from the comparator 28 is high.

The remaining third input terminal of the NOR gate 72a is connected via an inverter 76a to an input path between the level adjusting circuit 60A and the pin T20 of the main microcomputer 20A. Similarly, the remaining third input terminal of the NOR gate 82a is connected via an inverter 86a to an input path between the level adjusting circuit 60A and the pin T30 of the sub microcomputer 30A.

Specifically, when the $\overline{\text{STB}}$ signals are generated by the main and sub microcomputers 20A and 30A, the $\overline{\text{STB}}$ signals and the inverters 76a and 86a allow the remaining third input terminals of the NOR gates 72a and 82a to be high, respectively. In contrast, while no $\overline{\text{STB}}$ signals are generated by the main and sub microcomputers 20A and 30A, the remaining third input terminals of the NOR gate 72a and 82a are in the low level.

An input path connected to the pin T21 of the main microcomputer 20A through which the $\overline{\text{STB}}$ signal flows is connected to the power supply line PL1 via a resistor R11. Similarly, an input path connected to the pin T31 of the sub microcomputer 30A through which the $\overline{\text{STB}}$ signal flows is connected to the power supply line PL2 via a resistor R12.

As set forth above, the output of the NOR gate 72a has a level determined by inverting the level of an input bit of a CAN message TX output from the pin T21 of the main microcomputer 20A only when no $\overline{\text{STB}}$ signal is input to the NOR gate 72a and the power supply voltage Vcc2 is normally applied to the bus transceiver 50A. In other words, only when the second and third input terminals of the NOR gate 72a are low, the output of the NOR gate 72a depends on an inverted level of an input bit of a CAN message TX output from the pin T21 of the main microcomputer 20A.

In contrast, when either the main microcomputer 20A is in standby state so that the $\overline{\text{STB}}$ signal is input via the inverter 76a to the NOR gate 72a or no power supply voltage Vcc2 is applied to the bus transceiver 50A so that the bus transceiver 50A does not normally operate, the output of the NOR gate 72a is fixed to the low level independently of the level of an input bit of a CAN message TX output from the pin T21 of the main microcomputer 20A.

Similarly, the output of the NOR gate 82a has a level determined by inverting the level of an input bit of a CAN message TX output from the pin T31 of the sub microcomputer 30A only when no $\overline{\text{STB}}$ signal is input to the NOR gate 82a and the power supply voltage Vcc2 is normally applied to the bus transceiver 50A. In other words, only when the second and third input terminals of the NOR gate 82a are low, the output of the NOR gate 82a depends on an inverted level of an input bit of a CAN message TX output from the pin T31 of the sub microcomputer 30A.

In contrast, when either the sub microcomputer 30A is in standby state so that the $\overline{\text{STB}}$ signal is input via the inverter 86a to the NOR gate 82a or no power supply voltage Vcc2 is applied to the bus transceiver 50A so that the bus transceiver 50A does not normally operate, the output of the NOR gate 82a is fixed to the low level independently of the level of an input bit of a CAN message TX output from the pin T31 of the sub microcomputer 30A.

The input paths connected to the pins T21 and T31 of the main and sub microcomputers 20A and 30A through which the $\overline{\text{STB}}$ signals flow are connected via resistors R19 and R20 to the bases of NPN transistors TR3 and TR4 whose emitters are grounded, respectively.

The bases of the transistors TR3 and TR4 are grounded via resistors R21 and R22, respectively. The collectors of the transistors TR3 and TR4 are connected to the other of the pared input terminals of the NOR gates 94a and 94b, respectively. The collectors of the transistors TR3 and TR4 are respectively connected via resistors R23 and R24 to the power supply line PL3. In addition, the collectors of the transistors TR3 and TR4 are connected to the cathodes of diodes D9 and D10, respectively, and the anodes are merged to be connected to the pin T50 of the bus transceiver 50A.

Thus, when no $\overline{\text{STB}}$ signal with the low level is input to the bases of the NOR gates 94a and 94b, the transistors TR3 and TR4 are on so that the other of the input terminals of the NOR gates 94a and 94b are low.

In contrast, when the $\overline{\text{STB}}$ signal with the low level is input to the bases of the transistors TR3 and TR4, the transistors TR3 and TR4 are off so that the other of the input terminals of the NOR gates 94a and 94b are high based on the power supply voltage Vcc1 fed through the power supply line PL3.

The off state of the transistors TR3 and TR4 allows the power supply voltage Vcc2 fed from the power supply line PL3 to turn an output path connected to the terminal STB high. As a result, the STB signal with the high level is output from the level adjusting circuit 60A via the pin T50 to the bus transistor 50A, which causes the bus transceiver 50A to be in standby state.

Therefore, the output of the NOR gate 94a has a level determined by inverting the level of an input bit of a CAN message RXD output from the pin T52 of the bus transceiver 50A only when a target circuit 20A or 30A for the CAN message RXD and the bus transceiver 50A normally operates. In other words, only when the other of the paired input terminals of the NOR gate 94a is low and the bus transceiver 50A is in normal mode, the output of the NOR gate 94a depends on an inverted level of an input bit of the CAN message RTX output from the pin T52 of the bus transceiver 50A.

In contrast, when a target circuit 20A or 30A for the CAN message RXD and the bus transceiver 50A are in standby state or sleep state, the $\overline{\text{STB}}$ signal with the low level is input to the base of the transistor TR3, and the transistor TR3 is in off state. The off state of the transistor TR3 allows the other one of the paired input terminals of the NOR gate 94a to be high. This causes the output of the NOR gate 94a to be fixed to the low level independently of the level of an input bit of the CAN message RTX input from the pin T52 of the bus transceiver 50A.

Similarly, the output of the NOR gate 94b has a level determined by inverting the level of an input bit of a CAN message RXD output from the pin T52 of the bus transceiver 50A only when a target circuit 20A or 30A for the CAN message RXD and the bus transceiver 50A normally operates. In other words, only when the other of the paired input terminals of the NOR gate 94b is low and the bus transceiver 50A is in normal communication mode, the output of the NOR gate 94b depends on an inverted level of an input bit of the CAN message RTX output from the pin T52 of the bus transceiver 50A.

In contrast, when a target circuit 20A or 30A for the CAN message RXD and the bus transceiver 50A are in standby state or sleep state, the $\overline{\text{STB}}$ signal with the low level is input to the base of the transistor TR4, and the transistor TR4 is in off state. The off state of the transistor TR4 allows the other one of the paired input terminals of the NOR gate 94b to be high. This causes the output of the NOR gate 94b to be fixed to the low level independently of the level of an input bit of the CAN message RTX input from the pin T52 of the bus transceiver 50A.

The paired input terminals of the NOR gate 92a are respectively connected to the anodes of diodes D5 and D6 whose cathodes are connected to the power supply line PL4. The paired input terminals of the NOR gate 92a are also grounded via resistors R15 and R16, respectively. The input terminals of the inverters 74a and 84a are respectively connected to the cathodes of diodes D7 and D8 whose anodes are connected to the power supply lines PL1 and PL2. The input terminals of the inverters 74a and 84a are also grounded via resistors R17 and R18, respectively.

These diodes D5 to D8 and resistors R15 to R18 serve as protection circuits for protecting corresponding target circuits from the level adjusting circuit 60A.

Specifically, one of the diodes D5 to D8 and a corresponding one of the resistors R15 to R18 are coupled to a corresponding communication path between the level adjusting circuit 60A and a target circuit therefor, and they are subjected to a power supply voltage for the target circuit. For example, the diode D5 and the corresponding resistor R15 are coupled to a communication line between the level adjusting circuit 60A and the pin T51 of the bus transceiver 50A, and they are subjected to the power supply voltage Vcc2 for the bus transceiver 50A.

Accordingly, the configuration of one of the diodes D5 to D8 and a corresponding one of the resistors R15 to R18 allow a voltage change on a corresponding communication path between the level adjusting circuit 60A and a target circuit therefor to be limited within the range of the power supply voltage for the target circuit.

For example, the configuration of the diode D5 and the resistor R15 allows a voltage change on the communication line between the level adjusting circuit 60A and the pin T51 of the bus transceiver 50A to be limited within the range of the power supply voltage Vcc2 for the bus transceiver 50A.

Thus, even if power supply from the power supply circuit 40 is interrupted to a corresponding target circuit, a current can be prevented from flowing from the level adjusting circuit 60A into a corresponding target circuit via a corresponding communication path. This makes it possible to protect the components in the target circuits for the level adjusting circuit 60A during power supply interruption thereto.

As described above, in the integrated ECU 2A in which the main and sub microcomputers 20A and 30A are installed according to the second embodiment, the level adjusting circuit 60A allows an input bit with a level of a CAN message transmitted from the main microcomputer 20A to be output therefrom without change in level even though a communication route between the NOR gates 72a and 92a or that between the NOR gates 82a and 92a for the sub microcomputer 30A is contacted to a ground line GL.

Specifically, the level adjusting circuit 60A of this second embodiment can output an input bit with a level of a CAN message transmitted from one of the microcomputers 20A and 30A as a target circuit without change in level even though part of a communication route is contacted to a ground line GL; this communication route is located in the level adjusting circuit 60A and connects between the other of the microcomputers 20A and 30A and the level adjusting circuit 60A.

In addition, it is assumed that part of a communication route, which is located in the level adjusting circuit 60A and connects between one of the main and sub microcomputers 20A and 30A and the level adjusting circuit 60A, is contacted to a ground line GL to be grounded.

In this assumption, a NOT gate mounted on the grounded communication route allows a recessive bit (high level) to be constantly output to the one of the microcomputers 20A and 30A independently of an input level of a bit of a CAN message input to the level adjusting circuit 60A.

For these reasons, it is possible for the level adjusting circuit 60A and the other of the microcomputers 20A and 30A to continue communications with each other via the communication routes therebetween with little influence from the grounding of a communication route between the level adjusting circuit 60A and the one of the microcomputers 20A and 30A.

Accordingly, in the level adjusting circuit 60A according to the second embodiment, even if a communication route via which the level adjusting circuit 60A and a target circuit are coupled to each other is contacted to a ground line GL, it is possible to limit the effects of the grounding of the communication route. This therefore makes it possible to:

divide the level adjusting circuit 60A into a number of circuits for the target circuits including the power supply circuit 40; and integrate the divided circuits with the respective target circuits, thereby extending communication routes between the divided circuits.

This is because, even if one of the communication routes is contacted to a ground line GL, it is possible to continue communications via another one of the communication routes with little influence from the grounding of the one of the communication routes.

Moreover, in the level adjusting circuit 60A of this second embodiment, the $\overline{STB}$ signals to be output from the microcomputers 20A and 30A and/or power supply voltages Vdd1 and Vdd2 for target circuits (main and sub microcomputers 20A and 30A) are captured as the disabling control signal. That is, the output of at least one of the NOR gates 72a and 82a can be fixed to the low level when a corresponding at least one of the target circuits is in standby mode or sleep mode.

Accordingly, when at least one of the target computers 20A and 30A is in standby mode or sleep mode, the output level fixing can disable an input route of a CAN message TX corresponding to the at least one of the target computers 20A and 30A and transmitted therefrom via a corresponding at least one of the pins T21 and T31. This makes it possible to:

disable communications on a communication route between the level adjusting circuit 60A and the at least one of the target computers 20A and 30A; and ensure communications on a communication route between the level adjusting circuit 60A and another at least one of the target circuits.

Moreover, in the level adjusting circuit 60A, when the STB signal with the high level representing that the wakeup circuit 54b is in standby state or sleep state is captured as the disabling control signal. That is, the output of each of the NOR gates 94a and 94b can be fixed to the low level when the bus transceiver 50A is in standby mode or sleep mode.

When the bus transceiver 50A is in standby mode or sleep mode, the output level fixing can disable an input route of a CAN message RXD from the bus transceiver circuit 50A via the pin RXD. This makes it possible to disable communications on a communication route between the level adjusting circuit 60A and the bus transceiver 50A.

In the second embodiment, the level adjusting circuit 60A uses the $\overline{STB}$ signals, the STB signals, and the power supply voltages, in combination or alone, for a target circuit as the disabling control signal, but the present invention is not limited to the structure.

Specifically, each of the target circuits 20A, 30A, and 50A can be configured to periodically output, to the level adjusting circuit 60A, a watch dog pulse as the disabling control signal in addition to or in place of the $\overline{STB}$ signals, the STB signals, and the power supply voltages. When the level adjusting circuit 60A does not receive a watchdog signal within a preset period of time from at least one of the target circuits, the level adjusting circuit 60A can fix the output of a corresponding at least one of the NOR gates 72a, 82a, 94a, and 94b to the low level. This makes it possible to disable communications on a communication route between the level adjusting circuit 60A and the at least one of the target circuits while safely ensuring a communication route between the level adjusting circuit 60A and the remaining at least one of the target circuits.

Third Embodiment

An ECU 2B according to a third embodiment of the present invention will be described hereinafter.

Like reference characters are assigned to like parts in the ECUs according to the first and third embodiments. Descriptions of the like parts of the ECU according to the third embodiment will be therefore omitted, and different parts of the ECU according to the third embodiment from those according to the first embodiment will be described in detail hereinafter.

Figure 6:
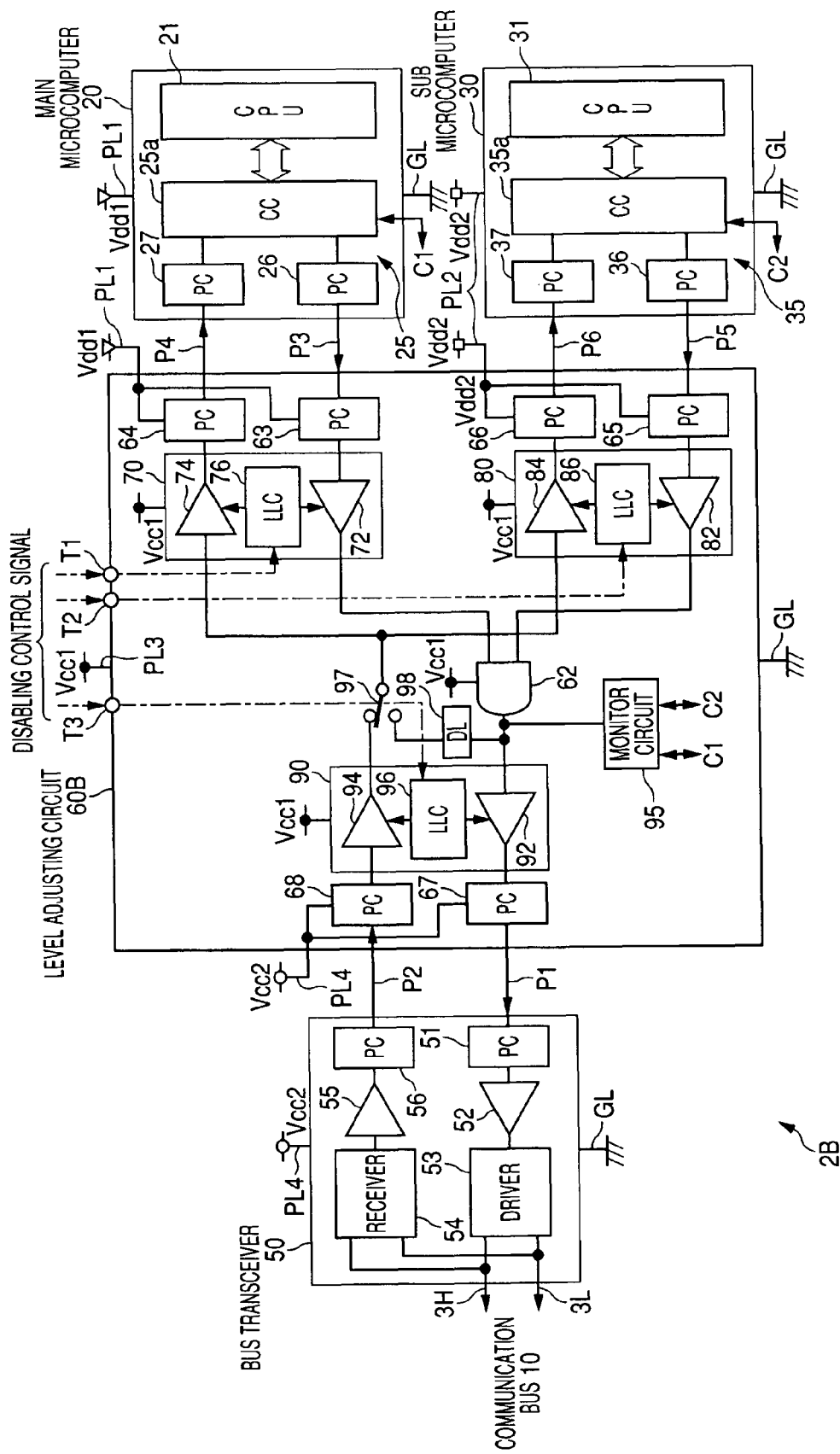
FIG. 6 is a circuit diagram schematically illustrating electrical configurations of an ECU according to a third embodiment of the present invention.

FIG. 6 schematically illustrates electrical configurations of a bus transceiver 50, a level adjusting circuit 60B, and each of the main and sub microcomputers 20 and 30 of the ECU 2B according to the third embodiment of the present invention.

As illustrated in FIG. 6, a main different point of the hardware configuration of the ECU 2B from that of the ECU 2 is that the level adjusting circuit 60B includes a route selector switch 97 and a delay circuit (abbreviated as DL in FIG. 6) 98.

The route selector switch 97 serving as route switching means is provided on a communication route between the third buffer 90 and each of the first and second buffers 70 and 80.

The route selector switch 97 is configured to select a CAN message captured from the bus transceiver 50 via the third buffer 90 or a CAN message output from the AND gate 62 to thereby transfer the selected data to each of the first and second buffer circuits 70 and 80. The route selector switch 97 starts to operate in response to the disabling control signal input from the third input terminal T3 for disabling the communication routes between the level adjusting circuit 60B and the bus transceiver 50.

Specifically, in the level adjusting circuit 60 according to the first embodiment, when the communication routes between the level adjusting circuit 60 and the bus transceiver 50 are disabled, the level adjusting circuit 60 cannot communicate with each of the main and sub microcomputers 20 and 30.

In order to avoid this situation, the level adjusting circuit 60B of this third embodiment causes the route selector switch 97 to select the output of the AND gate 62 when the disabling control signal for disabling the communication routes toward the bus transceiver 50 is input thereto. This can ensure communication routes between the main microcomputer 20 and the sub microcomputer 30.

As described above, in the level adjusting circuit 60B of this third embodiment, when the bus transceiver 50 does not normally operate, input of the disabling control signal to the level adjusting circuit 60B from the main or sub microcomputer as a direct communication request permits the main and sub microcomputers 20 and 30 to directly communicate with each other. This direct communications between the main and sub microcomputers 20 and 30 can be established when communications for initialization are carried out therebetween immediately after start-up of the ECU 2B, or when it is necessary for the main and sub microcomputers 20 and 30 to communicate information with each other while the information remains completely secret.

When such direct communications are carried out between the main and sub microcomputers 20 and 30, output of CAN messages toward the bus transceiver 50 is interrupted, and the driver 53 of the bus transceiver 50 is inactive so that no voltages are generated on the communication bus 10 by the driver 53. This permits power consumption of the ECU 2B to be reduced.

In addition, the delay circuit 98 is connected between the output terminal of the AND gate 62 and the route selector switch 97.

The delay circuit 98 is operative to hold a CAN message output from the AND gate 62 for a predetermined delay time so as to match a transmission time required to communicate a CAN message between the communication bus 10 and the microcomputers 20 and 30 via the bus transceiver 50 with that required to communicate a CAN message between the microcomputers 20 and 30 via the route selector switch 97. As the predetermined delay time, a time required between transmission of a CAN message from the level adjusting circuit 60B to the bus transceiver 50 and return of the CAN message from the bus transceiver 50 to the level adjusting circuit 60B can be set.

Figure 7A:
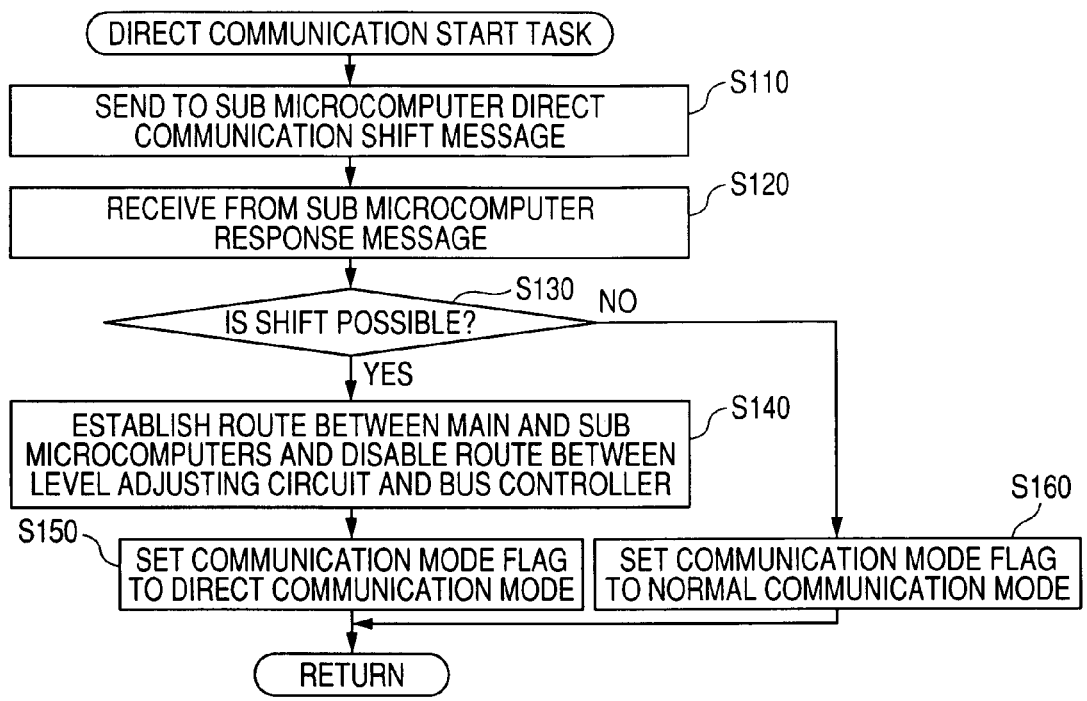
FIG. 7A is a flowchart schematically illustrating a direct communication start task to be executed by a main microcomputer according to the third embodiment.

FIG. 7A schematically illustrates a direct communication start task to be executed by the main microcomputer 20 in accordance with a direct communication start program stored in the memory 22 in order to carry out direct communications between the main and sub microcomputers 20 and 30.

For example, the direct communication start task can be preformed by the main microcomputer 20 for initialization of the sub microcomputer 30 immediately after start up of the ECU 2B, or for transfer of a critical CAN message to the sub microcomputer 30 in response to, for example, an interrupt.

When starting the direct communication start program, the CPU 21 of the main microcomputer 20 sends, to the sub microcomputer 30, a CAN message representing a negotiation of direct communication shift in step S110. The CAN message sent from the main microcomputer 20 is transferred to the sub microcomputer 30 via the level adjusting circuit 60B, the bus transceiver 50, and the communication bus 10.

The sub microcomputer 30 receives the CAN message representing the notice of direct communication shift, and sends, to the main microcomputer 20, a response CAN message representing whether direct communication is possible. The response CAN message sent from the sub microcomputer 30 is transferred to the main microcomputer 20 via the level adjusting circuit 60B, the bus transceiver 50, and the communication bus 10.

When the response CAN message sent from the sub microcomputer 30 is transferred to the main microcomputer 20, the CPU 21 receives the response CAN message in step S120, and determines whether direct communication shift is possible in step S130.

When it is determined that direct communication shift is possible (the determination in step S130 is YES), the CPU 21 proceeds to step S140, and outputs the disabling control signal to the level lock circuit 96 of the level adjusting circuit 60B via the input terminal T3 in step S140.

The disabling control signal input to the level lock circuit 96 and the route selector switch 97 allows:

the level lock circuit 96 to disable the communication routes between the third buffer 90 and the bus transceiver 50; and the route selector switch 97 to select the output of the AND gate 62 to thereby establish a communication route from the AND gate 62 to each of the first and second buffers 70 and 80.

Subsequently, the CPU 21 sets a flag identifying its communication mode to a value indicative of direct communication mode between the main and sub microcomputers 20 and 30 without the intervention of the bus transceiver 50, returning to a routine (program) to carry out direct communications in the direct communication mode.

Otherwise when it is determined that direct communication shift is not possible (the determination in step S130 is NO), the CPU 21 proceeds to step S160, and sets the communication mode flag to a value indicative of normal communication mode via the bus transceiver 50, returning to a main routine (program) for control of the at least one target device.

Figure 7B:
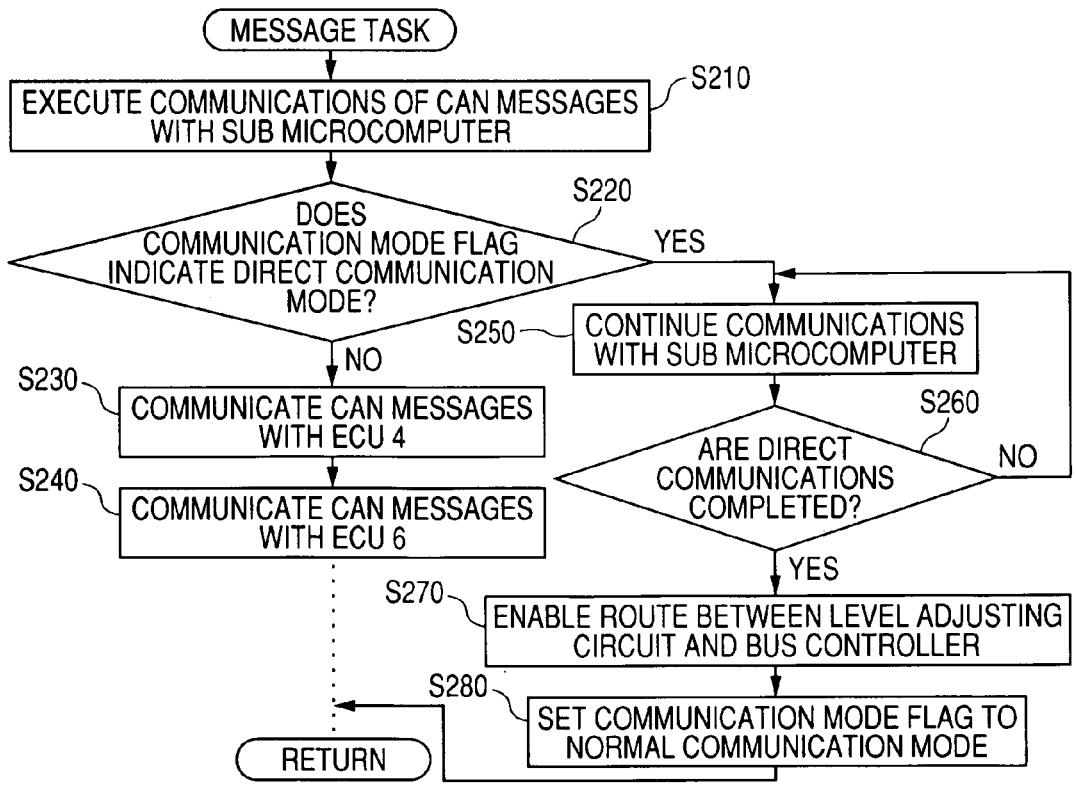
FIG. 7B is a flowchart schematically illustrating a message task to be repeatedly executed by a main microcomputer according to the third embodiment.

In addition, FIG. 7B schematically illustrates a message task to be repeatedly executed by the main microcomputer 20 for sequential communications with the sub microcomputer 30 and the other ECUs 4, 6, . . . coupled to the communication bus 10 in accordance with a message task program stored in the memory 22.

When starting the message task, the CPU 21 carries out communications of CAN messages with the CPU 31 of the sub microcomputer 30 in step S210.

Next, the CPU 21 determines whether the communication mode flag indicates the direct communication mode in step S220.

When it is determined that the communication mode flag not indicates the direct communication mode but the normal communication mode (the determination in step S220 is NO), the CPU 21 sequentially communicates CAN messages with the individual other ECUs 4, 6, . . . in steps S230, S240, . . . . When communications with the last ECU are completed, the CPU 21 returns to the main routine.

Otherwise when it is determined that the communication mode flag indicates the direct communication mode (the determination in step S220 is YES), the CPU 21 proceeds to step S250, and continues communications (direct communications) with the sub microcomputer 30 until it determines that the direct communications with the sub microcomputer 30 are completed in steps S250 and 260.

Thus, when it is determined that the direct communications with the sub microcomputer 30 are completed in step 260, the CPU 21 stops the output of the disabling control signal to the level lock circuit 96 of the level adjusting circuit 60B via the input terminal T3 in step S270.

The stop operation of the disabling control signal allows:

the level lock circuit 96 to enable the communication routes between the third buffer 90 and the bus transceiver 50; and the route selector switch 97 to select the output of the line buffer 94 to thereby establish a communication route from the line buffer 94 (third buffer 90) to each of the first and second buffers 70 and 80.

Subsequently, the CPU 21 sets the communication mode flag to the value indicative of the normal communication mode in step S280, returning to the main routine for control of the at least one target device.

As described above, it is possible for the main microcomputer 20 to execute the direct communication start task and message task illustrated in FIGS. 7A and 7B. This allows direct communications between the main and sub microcomputers 20 and 30 without using the bus transceiver 50 and the communication bus 10. Thus, even if large amount of CAN messages are directly communicated between the main and sub microcomputers 20 and 30, no large amount of CAN messages flow through the communication bus 10. This makes it possible to ensure the confidentiality of the large amount of CAN messages without occupying the communication bus 10. This can have no influence on communications by the other ECUs 4, 6, . . . via the communication bus 10.

In addition, the main and sub microcomputers 20 and 30 permit direct communications with each other with no influence from communication data flowing through the communication bus 10, making it possible to reduce the time required to communicate CAN messages between the main and sub microcomputers 20 and 30.

Fourth Embodiment

An ECU 2C according to a fourth embodiment of the present invention will be described hereinafter.

Like reference characters are assigned to like parts in the ECUs according to the third and fourth embodiments. Descriptions of the like parts of the ECU according to the fourth embodiment will be therefore omitted, and different parts of the ECU according to the fourth embodiment from those according to the third embodiment will be described in detail hereinafter.

Figure 8:
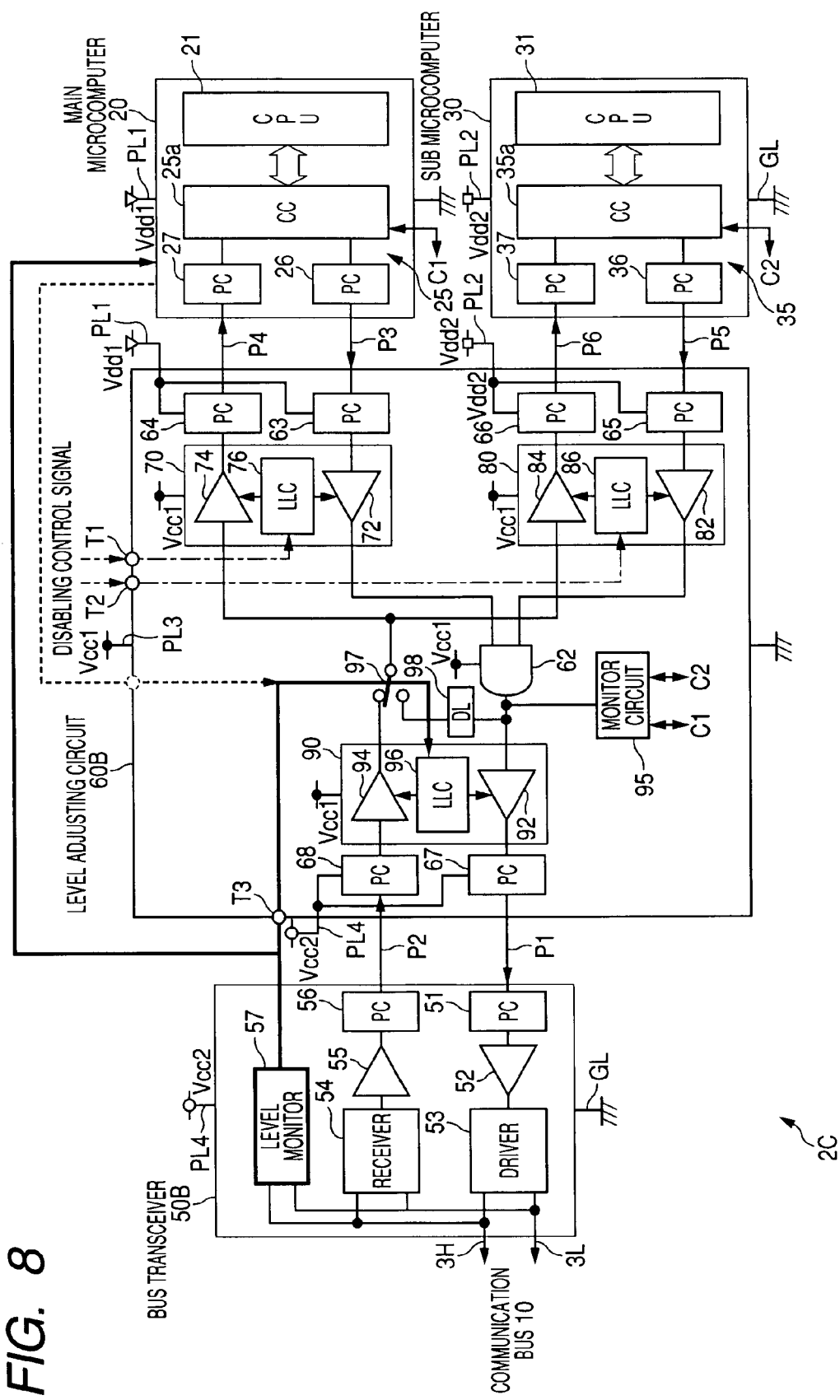
FIG. 8 is a block diagram schematically illustrating electrical configurations of an ECU according to a fourth embodiment of the present invention.

FIG. 8 schematically illustrates electrical configurations of a bus transceiver 50B, the level adjusting circuit 60B, and each of the main and sub microcomputers 20 and 30 of the ECU 2C according to the fourth embodiment of the present invention.

As illustrated in FIG. 8, a main different point of the hardware configuration of the ECU 2C from that of the ECU 2 is that the bus transceiver 50B includes a level monitor 57 for monitoring the voltage level on the communication bus 10, which serves as communication bus monitoring means.

Specifically, the level monitor 57 is connected to the input terminal T3 of the level adjusting circuit 60B and the main microcomputer 20. The level monitor 57 is also connected to the CAN_H and CAN_L of the communication bus 10 via the respective two signal lines 3H and 3L.

The level monitor 57 is operative to:

monitor the voltage levels (bus potentials) of the respective CAN_H and CAN_L of the communication bus 10;

determine whether the voltage levels of the CAN_H and CAN_L lie within predetermined allowable ranges, respectively; and when it is determined that either the voltage level of the CAN_H or that of the CAN_L falls outside the corresponding one of the allowable ranges, determine there is an abnormality on the communication bus 10 to generate the disabling control signal for disabling the communication routes between the bus transceiver 50B and the level adjusting circuit 60B.

For example, as described above, the first different voltage of 2.0 V between 3.5 V on the CAN_H and 1.5 V on the CAN_L represents the dominant level, and the second different voltage of 0 V between 2.5 V on the CAN_H and 2.5 V on the CAN_L represents the recessive level. In this setting, as the allowable range for the voltage level of the CAN_H, a range between 2.0 to 4.5 V can be set. Similarly, in this situation, as the allowable range for the voltage level of the CAN_L, a range between 0.5 to 3.0 V can be set.

The disabling control signal output from the level monitor 57 is input via the input terminal T3 to the route selector switch 97, the level lock circuit 96 of the third buffer 90, and the main microcomputer 20.

As well as the third embodiment, the disabling control signal input to the level lock circuit 96, the route selector switch 97, and the main microcomputer 20 allows:

the level lock circuit 96 to disable the communication routes between the third buffer 90 and the bus transceiver SOB;

the route selector switch 97 to select the output of the AND gate 62 to thereby establish a communication route from the AND gate 62 to each of the first and second buffers 70 and 80; and the main microcomputer 20 to detect a communication-bus abnormality, thereby shifting the communication mode flag from the normal communication mode to the direct communication mode (see step S150 in FIG. 7A).

Accordingly, in the fourth embodiment, it is possible for the main and sub microcomputers 20 and 30 to directly communicate with each other even in the event of a communication-bus failure.

It is to be noted that the disabling control signal output from the level monitor 57 need not necessarily be directly input to the level adjusting circuit 60B. Specifically, as illustrated by the dashed line in FIG. 8, when receiving the disabling control signal, the main microcomputer 20 can input the received disabling control signal to the level lock circuit 96 of the level adjusting circuit 60B.

Fifth Embodiment

An ECU 2D according to a fifth embodiment of the present invention will be described hereinafter.

Like reference characters are assigned to like parts in the ECUs according to the first and fifth embodiments. Descriptions of the like parts of the ECU according to the fifth embodiment will be therefore omitted, and different parts of the ECU according to the fifth embodiment from those according to the first embodiment will be described in detail hereinafter.

Figure 9:
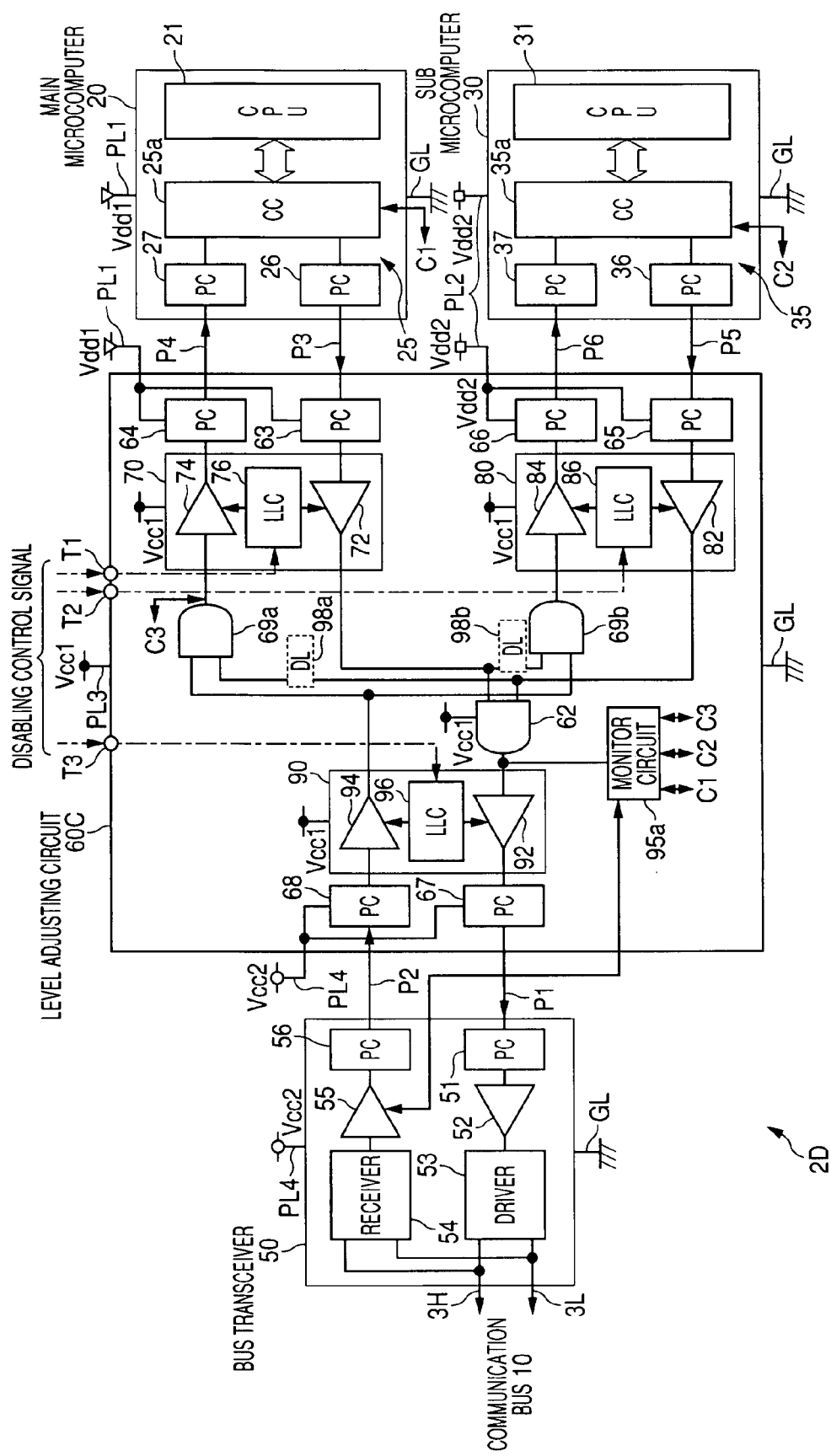
FIG. 9 is a block diagram schematically illustrating electrical configurations of an ECU according to a fifth embodiment of the present invention.

FIG. 9 schematically illustrates electrical configurations of the bus transceiver 50, a level adjusting circuit 60C, and each of the main and sub microcomputers 20 and 30 of the ECU 2D according to the fifth embodiment of the present invention.

As illustrated in FIG. 9, a main different point of the hardware configuration of the ECU 2D from that of the ECU 2 is that the level adjusting circuit 60C includes AND gates 69a and 69b.

The AND gate 69a has a pair of input terminals and an output terminal. One of the paired input terminals of the AND gate 69a is connected to an output terminal of the eighth line buffer 94. The other of the paired input terminals of the AND gate 69a is connected to the second input terminal of the AND gate 62 and to an output terminal of the fifth buffer 82. The output terminal of the AND gate 69a is connected to an input terminal of the fourth line buffer 74.

Similarly, the AND gate 69b has a pair of input terminals and an output terminal. One of the paired input terminals of the AND gate 69b is connected to the output terminal of the eighth line buffer 94. The other of the paired input terminals of the AND gate 69b is connected to the first input terminal of the AND gate 62 and to an output terminal of the third line buffer 72. The output terminal of the AND gate 69b is connected to an input terminal of the sixth line buffer 84.

The monitor circuit 95a is connected to the output terminals of the AND gates 62, 69a, and 69b, and to each of the communication circuits 25a and 35a of the main and sub microcomputers 20 and 30. In addition, the monitor circuit 95a is connected to the second buffer 55 of the bus transceiver 50.

In the fifth embodiment, it is to be noted that each of the main and sub microcomputers 20 and 30 is higher in priority than the bus transceiver 50. For this reason, the number of an identifier of a CAN message transmitted from each of the main and sub microcomputers 20 and 30 is lower than that of an identifier of a CAN message transmitted from the bus transceiver 50.

Specifically, the AND gate 69a is operative to give priority to transference of one of CAN messages sent from the fifth and eighth line buffers 82 and 94 when the SOF bit of one of the CAN messages is input to the AND gate 69a sooner than the other thereof.

Specifically, when the SOF bits of the CAN messages sent from the fifth and eighth line buffers 82 and 94 are simultaneously input to the AND gate 69a, the AND gate 69a caries out logical AND combination of the remaining bits of one of the CAN messages with those of the other thereof bit-by-bit.

The logical AND combination allows a dominant bit of one of the CAN messages to "win" if a dominant bit of one of the CAN messages and a recessive bit of the other thereof simultaneously appears on the paired input terminals of the AND gate 69a.

The monitor circuit 95a is operative to monitor a bit (level) to be asserted on the output terminal of the AND gate 69a and to send the monitor result to each of the communication circuit 25a of the main microcomputer 20 and the second buffer 55 of the bus transceiver 50.

Specifically, as described in detail in the first embodiment, the number of the identifier of the CAN message transmitted via the fifth buffer 82 from the sub microcomputer 30 is higher than that of the identifier of the CAN message transmitted via the eighth buffer 94. For this reason, a predetermined-ordered dominant bit of the higher-priority CAN message transmitted from the higher-priority circuit 30 wins with the same-ordered recessive bit of the lower-priority CAN message transmitted from the lower-priority circuit 50.

Thus, the higher-priority CAN message output from the sub microcomputer 30 is continuously transmitted via the AND gate 69a and the first buffer 70 to the main microcomputer 20.

On the other hand, the monitor circuit 95a and the receiver 55 cause the second buffer 55 to stop transmission of the lower-priority CAN message and to restart transmission of the lower-priority CAN message output from the bus transceiver 50 to the level adjusting circuit 60C after completion of the transmission of the higher-priority CAN message.

Similarly, when the SOF bits of the CAN messages sent from the third and eighth line buffers 72 and 94 are simultaneously input to the AND gate 69b, the operations of the AND gate 69b, the monitor circuit 95a, and the second buffer 55 make it possible to:

continue transmission of a higher-priority CAN message output from the main microcomputer 20 via the AND gate 69b and the second buffer 80 to the sub microcomputer 30; and restart transmission of a lower-priority CAN message output from the bus transceiver 50 to the level adjusting circuit 60 after completion of the transmission of the higher-priority CAN message.

As described above, in the fifth embodiment of the present invention, the AND gate 69a allows the sub microcomputer 30 to transmit CAN messages to the main microcomputer 20 by priority from CAN messages output from the bus transceiver 50. Similarly, the AND gate 69b allows the main microcomputer 20 to transmit CAN messages to the sub microcomputer 30 by priority from CAN messages output from the bus transceiver 50.

Accordingly, when executing the direct communication start task and message task illustrated in FIGS. 7A and 7B, the main microcomputer 20 allows the disabling control signal to be output therefrom to the level lock circuit 96 of the level adjusting circuit 60c. This allows direct communications between the main and sub microcomputers 20 and 30 without using the bus transceiver 50 and the communication bus 10, and therefore, it is possible to obtain the same effects as in the case of the third embodiment.

It is to be noted that, in the fifth embodiment, as illustrated in FIG. 9 by the dashed line, a delay circuit 98a can be connected between the other of the paired input terminals of the AND gate 69a and the output terminal of the fifth buffer 82. Similarly, as illustrated in FIG. 9 by the dashed line, a delay circuit 98b can be connected between the other of the paired input terminals of the AND gate 69b and the output terminal of the third buffer 72.

For the same reason as in the case of the third embodiment, it is possible to match a transmission time required to communicate a CAN message between the communication bus 10 and the microcomputers 20 and 30 via the bus transceiver 50 and with that required to communicate a CAN message between the microcomputers 20 and 30 via the AND gate 69a or AND gate 69b.

Sixth Embodiment

An ECU 2E according to a sixth embodiment of the present invention will be described hereinafter.

Like reference characters are assigned to like parts in the ECUs according to the fifth and sixth embodiments. Descriptions of the like parts of the ECU according to the sixth embodiment will be therefore omitted, and different parts of the ECU according to the sixth embodiment from those according to the fifth embodiment will be described in detail hereinafter.

Figure 10:
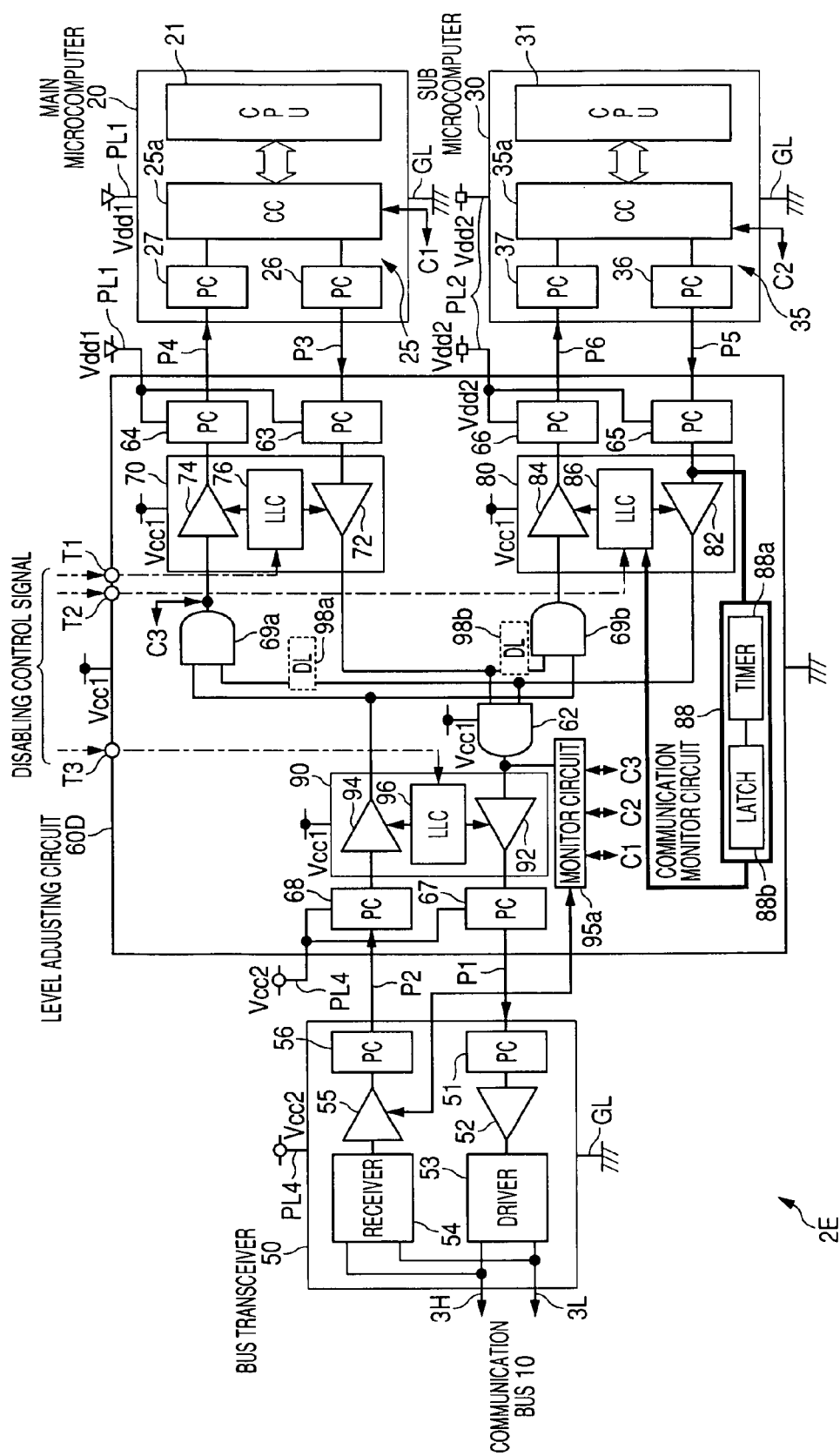
FIG. 10 is a block diagram schematically illustrating electrical configurations of an ECU according to a sixth embodiment of the present invention.

FIG. 10 schematically illustrates electrical configurations of the bus transceiver 50, a level adjusting circuit 60D, and the main and sub microcomputers 20 and 30 of the ECU 2E according to the sixth embodiment of the present invention.

As illustrated in FIG. 10, a main different point of the hardware configuration of the ECU 2D from that of the ECU 2 is that the level adjusting circuit 60D includes a communication monitor circuit 88.

The communication monitor circuit 88 is connected to the input terminal of the fifth line buffer 82 and to the level lock circuit 86.

The communication monitor circuit 88 is operative to:

monitor the level of each of individual bits of a CAN message transmitted from the sub microcomputer 30 toward the fifth line buffer 82 via the fifth protection circuit 65;

determine whether an error occurs in the CAN message based on the monitored level of each of the individual bits thereof; and output the disabling control signal to the level lock circuit 86 when it is determined that an error occurs in the CAN message based on the monitored level of each of the individual bits thereof.

Specifically, in the sixth embodiment, the communication monitor circuit 88 is composed of a timer circuit (abbreviated as timer in FIG. 10) 88a and a latch 88b. The timer circuit 88a is connected to the input terminal of the fifth line buffer 82. The latch 88b is connected at its input terminal to an output terminal of the timer circuit 88a and at its output terminal to the level lock circuit 86.

The timer circuit 88a is configured to:

measure a duration for which the same level, such as the low level (dominant level), are kept based on the monitored level of each of the individual bits thereof; and trigger to output, to the latch 88b, an error detection signal when the measured duration reaches a predetermined threshold duration (dominant time-out time). For example, the predetermined threshold duration corresponds to a predetermined number of consecutive dominant bits.

The latch 88b is operative to latch the error detection signal output from the timer circuit 88a, and to output the latched error detection signal to the level lock circuit 86.

Specifically, in the sixth embodiment, it is assumed that:

an error occurs in the sub microcomputer 30 or a communication route between the sub microcomputer 30 and the level adjusting circuit 60D, and the error causes the predetermined number of bits of a CAN message transmitted from the sub microcomputer 30 via a communication route to have the same dominant level.

In this assumption, the predetermined number of bits of a CAN message corresponds to the predetermined threshold duration. For this reason, a duration measured by the timer circuit 88a based on the monitored level of each of the individual bits of the CAN message reaches the predetermined threshold duration. Thus, the error detection signal is output from the timer circuit 88a, and the error detection signal is output to the level lock circuit 86 via the latch 88b.

As a result, the level lock circuit 86 disables the communication routes between the sub microcomputer 30 and the level adjusting circuit 60D while enables other communication routes between the remaining target circuits except for the sub microcomputer 30.

In the sixth embodiment, the level lock circuit 86 disables all of the communication routes between the sub microcomputer 30 and the level adjusting circuit 60D, but can disable only a communication route through which CAN messages are input from the sub microcomputer 30.

In the sixth embodiment, the communication monitor circuit 88 is operative to monitor the level of each bit of a CAN message transmitted from the sub microcomputer 30, but the present invention is not limited to the structure.

Specifically, the communication monitor circuit 88 can be operative to:

monitor the level of each bit of a CAN message transmitted from the main microcomputer 20; and output the error detection signal to the corresponding level lock circuit 76 for the main microcomputer 20 when it is determined that an error occurs in the CAN message based on the monitored level of each of the individual bits thereof, thereby disabling the communication routes between the main microcomputer 20 and the level adjusting circuit 60D.

Similarly, the communication monitor circuit 88 can be operative to:

monitor the level of each bit of a CAN message transmitted from the bus transceiver 50; and output the error detection signal to the corresponding level lock circuit 96 for the bus transceiver 50 when it is determined that an error occurs in the CAN message based on the monitored level of each of the individual bits thereof, thereby disabling the communication routes between the bus transceiver 50 and the level adjusting circuit 60D.

Moreover, the communication monitor circuit 88 can be provided in each of the target circuits 20, 30, and 50 for communications with the level adjusting circuit 60D.

Seventh Embodiment

An ECU 2F according to a seventh embodiment of the present invention will be described hereinafter.

Like reference characters are assigned to like parts in the ECUs according to the fifth and seventh embodiments. Descriptions of the like parts of the ECU according to the seventh embodiment will be therefore omitted, and different parts of the ECU according to the seventh embodiment from those according to the fifth embodiment will be described in detail hereinafter.

Figure 11:
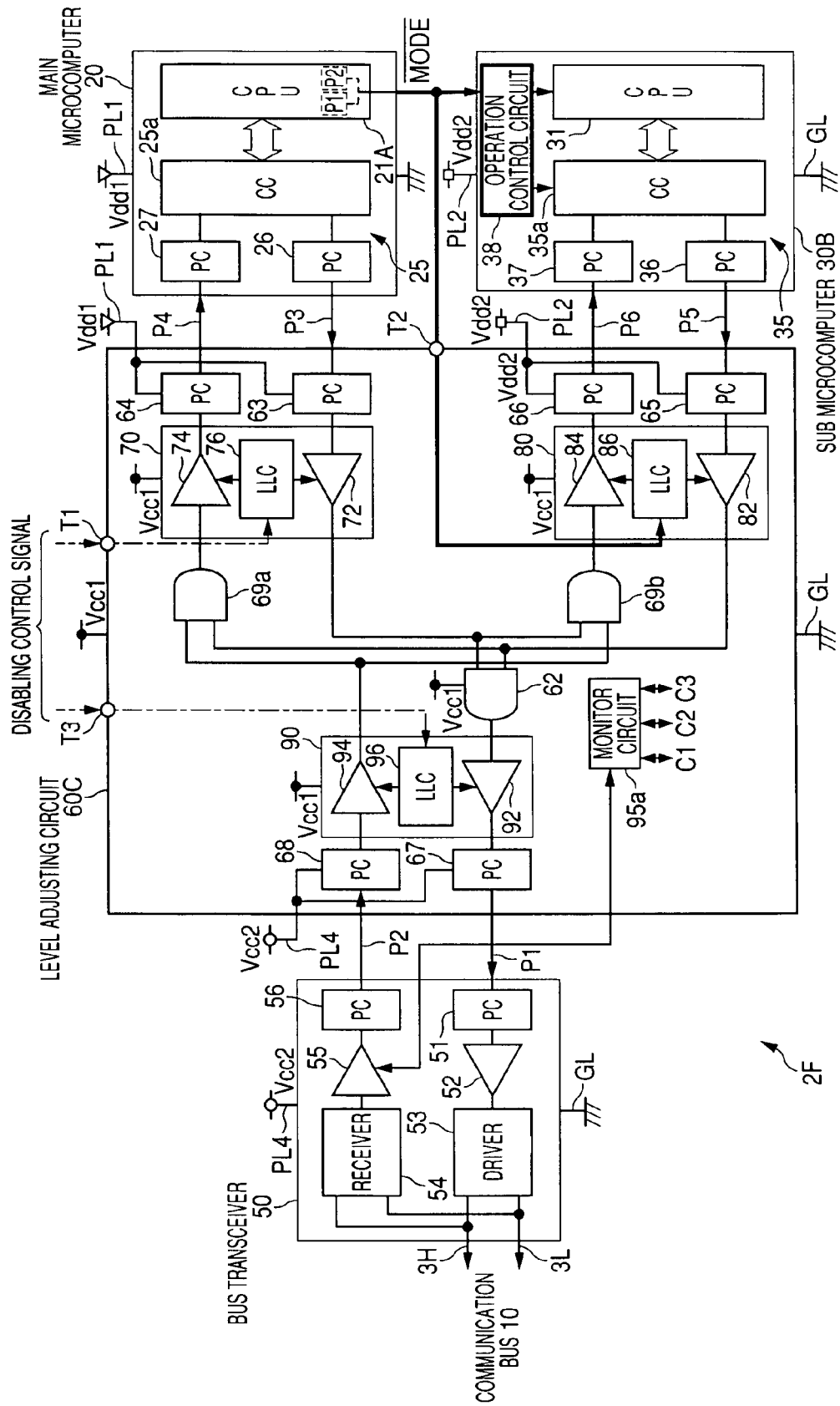
FIG. 11 is a block diagram schematically illustrating electrical configurations of an ECU according to a seventh embodiment of the present invention.

FIG. 11 schematically illustrates electrical configurations of the bus transceiver 50, the level adjusting circuit 60C, the main microcomputer 20, and a sub microcomputer 30B of the ECU 2F according to the seventh embodiment of the present invention.

As illustrated in FIG. 11, a main different point of the hardware configuration of the ECU 2F from that of the ECU 2D is that the sub microcomputer 30B includes an operation control circuit 38.

The operation control circuit 38 is connected to the CPU 31 and the communication control circuit 35a. The operation control circuit 38 is operative to allow the CPU 31 to shift its operational mode from normal mode to standby or sleep mode in response to a first operational mode control signal sent from the main microcomputer 20; this first operational mode control signal requests the operational-mode shift from the normal mode to the standby or sleep mode.

Specifically, the CPU 21A of the microcomputer 20 is programmed to perform a first operational mode control process P1 to thereby output the first operational mode control signal as need arises. In addition, the CPU 21A is programmed to perform a second operational mode control process P2 to thereby output a second operational mode control signal as need arises. The second operational mode control signal requests the operational-mode shift from the standby or sleep mode to the normal mode. When the second operational mode control signal is input to the operation control circuit 38 works to allow the CPU 31 to shift its operational mode from standby or sleep mode to normal mode in response to the second operational mode control signal input thereto.

In addition, the first or second operational mode control signal output from the main microcomputer 20 is configured to be input to the level lock circuit 86 of the level adjusting circuit 60C via the second input terminal T2 as the disabling control signal.

In the ECU 2F of this seventh embodiment, when the first operational mode control signal output from the main microcomputer 20 is input to the operation control circuit 38 of the sub microcomputer 30B, the operational mode of the sub microcomputer 30B is shifted from normal mode to standby mode or sleep mode by the operation control circuit 38. In response to the operation-mode shift from normal mode to standby mode or sleep mode, at least one communication route between the level adjusting circuit 60C and the sub microcomputer 30B is disabled by the level lock circuit 86 while enables other communication routes between the remaining target circuits except for the sub microcomputer 30.

Similarly, when the second operational mode control signal output from the main microcomputer 20 is input to the operation control circuit 38 of the sub microcomputer 30B, the operational mode of the sub microcomputer 30B is shifted from standby or sleep mode to normal mode by the operation control circuit 38.

Upon reception of the second operational mode control signal, the at least one communication route between the level adjusting circuit 60C and the sub microcomputer 30B is returned to be enabled by the level lock circuit 86.

It is to be noted that the CPU 21A can be programmed to execute the first operational mode control process P1 in response to receipt of a standby- or sleep-mode shift request (CAN message) from the sub microcomputer 30B itself or an external device via, for example, the communication bus 10. Similarly, it is also to be noted that the CPU 21A can be programmed to execute the second operational mode control process P2 in response to receipt of a normal-mode shift request (CAN message) from the sub microcomputer 30B itself or an external device via, for example, the communication bus 10.

In addition, the CPU 21A can be programmed, as the first operational mode control process P1, to:

monitor a watchdog pulse periodically output from the sub microcomputer 30B; and when it does not receive a watchdog pulse within a preset period of time from the sub microcomputer 30B, output, to the operation control circuit 38 of the sub microcomputer 30B the first operational mode control signal.

Moreover, the CPU 21A can be programmed, as the first operational mode control process P1, to:

monitor whether a reset request is passed from the sub microcomputer 30B; and when receiving the reset request from the sub microcomputer 30B based on the monitor result, output, to the operation control circuit 38 of the sub microcomputer 30B, the first operational mode control signal.

Furthermore, the CPU 21A can be programmed, as the first operational mode control process P1, to output, to the operation control circuit 38 of the sub microcomputer 30B, the first operational mode control signal in response to receipt of a request signal, as the first operational mode control signal, from an external device, such as a switch.

Still furthermore, the CPU 21A can be programmed, as the first operational mode control process P1, to output, to the operation control circuit 38 of the sub microcomputer 30B, the first operational mode control signal when the power supply voltage to be supplied to the sub microcomputer 30B is abnormally changed, for example, abnormally reduced.

Eighth Embodiment

An ECU 2G according to an eighth embodiment of the present invention will be described hereinafter.

Like reference characters are assigned to like parts in the ECUs according to the fifth and eighth embodiments. Descriptions of the like parts of the ECU according to the eighth embodiment will be therefore omitted, and different parts of the ECU according to the eighth embodiment from those according to the fifth embodiment will be described in detail hereinafter.

Figure 12:
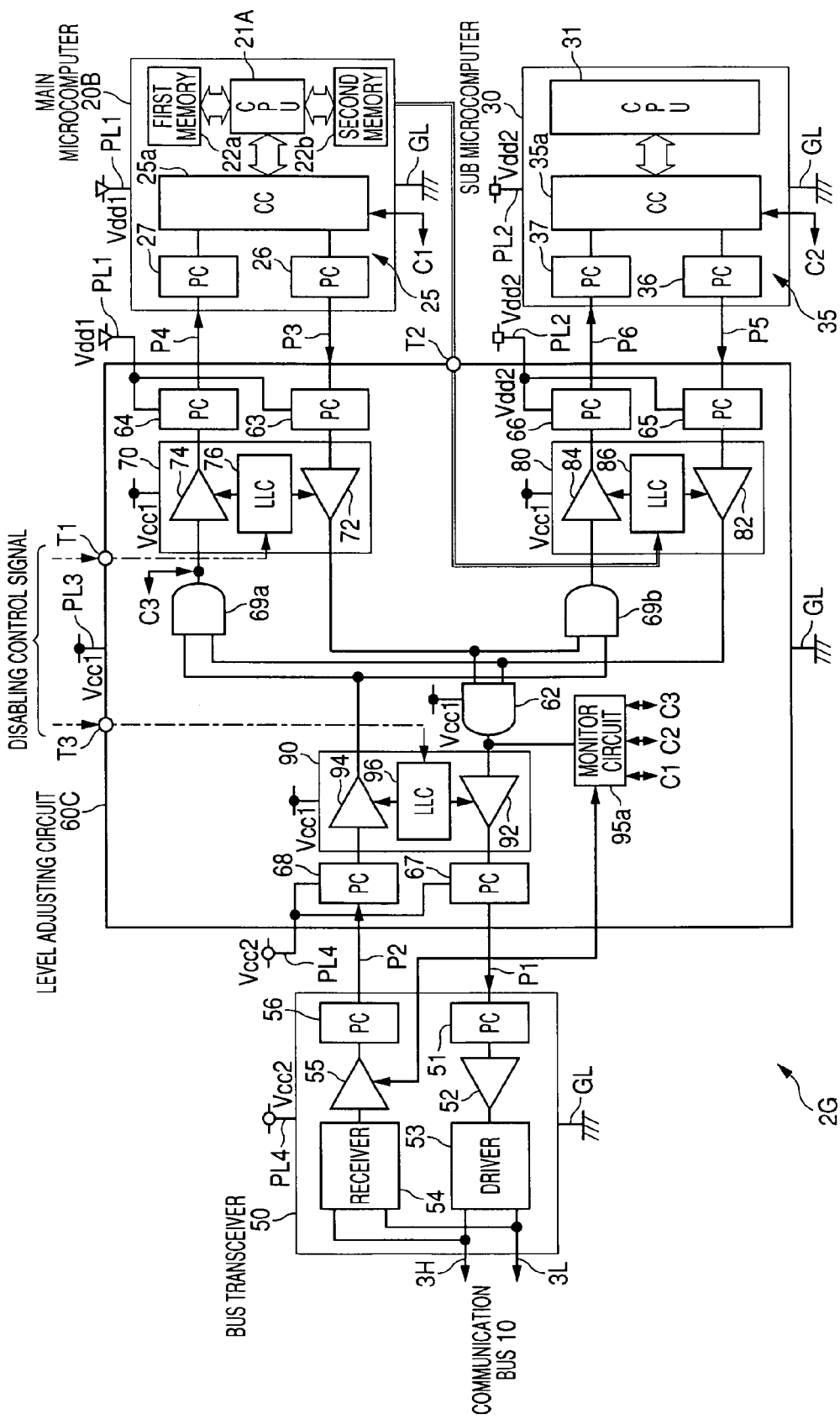
FIG. 12 is a block diagram schematically illustrating electrical configurations of an ECU according to an eighth embodiment of the present invention.

FIG. 12 schematically illustrates electrical configurations of the bus transceiver 50, the level adjusting circuit 60, a main microcomputer 20B, and the sub microcomputer 30 of the ECU 2G according to the eighth embodiment of the present invention.

As illustrated in FIG. 12, a main different point of the hardware configuration of the ECU 2G from that of the ECU 2D is that a memory 22A of the main microcomputer 20B consists essentially of a non-rewritable memory (first memory) 22a and a rewritable memory (second memory) 22b. In the rewritable memory 22b, critical pieces of data and/or programs required for at least one of the external units on the communication bus 10 to control a corresponding at least one target device.

Figure 13:
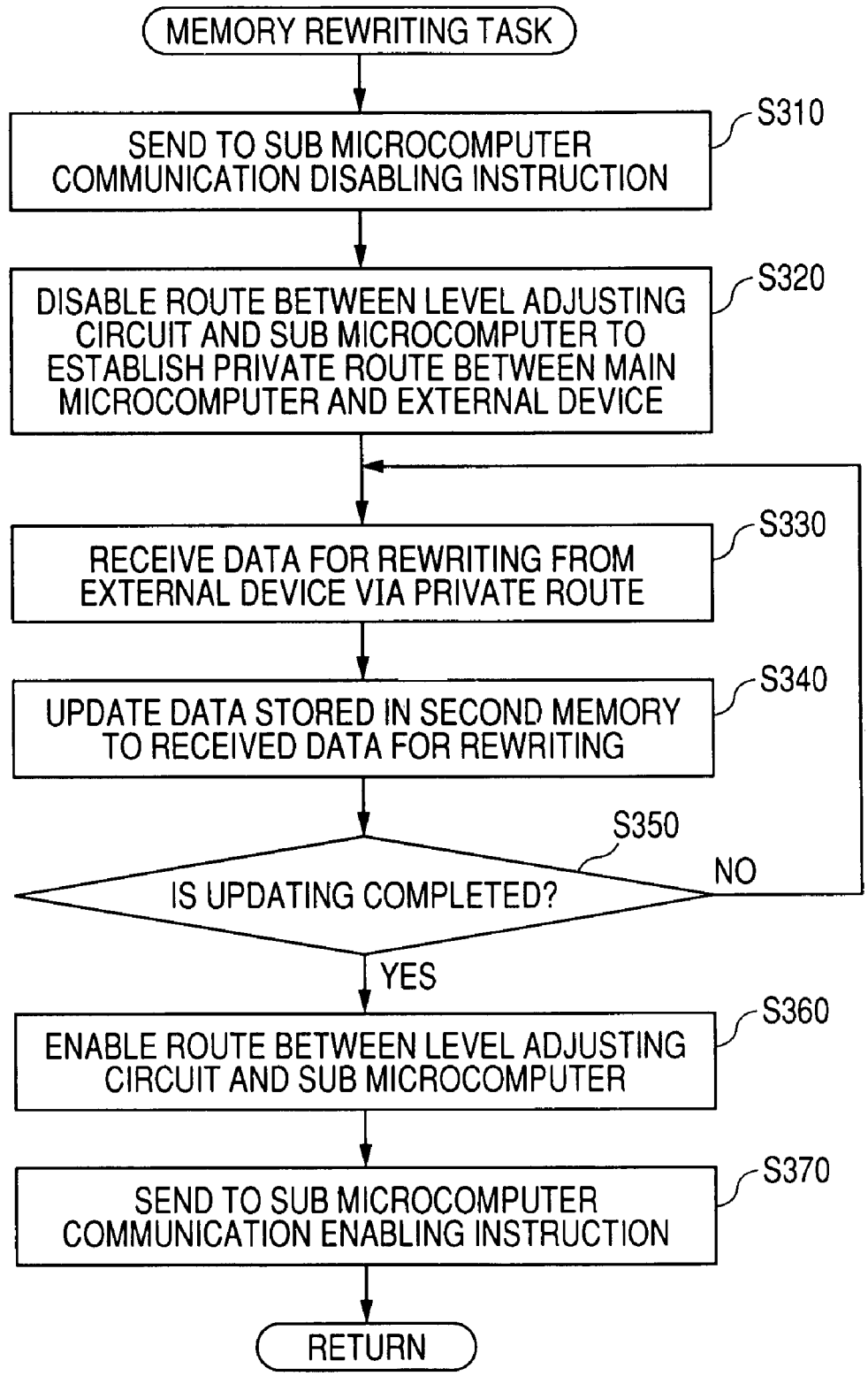
FIG. 13 is a flowchart schematically illustrating a memory rewriting task to be executed by a main microcomputer according to the eighth embodiment.

Specifically, the CPU 21A of the main microcomputer 20B is programmed to execute a memory rewriting task illustrated in FIG. 13 when receiving a CAN message for rewriting transmitted from at least one external device connected to the communication bus 10. The CAN message for rewriting represents an instruction for the CPU 21A to rewrite a specified piece of data or a specified program stored in the rewritable memory 22b. The execution of the memory rewriting task permits the level adjusting circuit 60 to disable communication routes between the sub microcomputer 30 and the level adjusting circuit 60, which provides private communication routes between the main microcomputer 20B and the at least one external device via the level adjusting circuit 60, the bus transceiver 50, and the communication bus 10.

FIG. 13 schematically illustrates the memory rewriting task to be executed by the main microcomputer 20B in accordance with a memory rewriting program stored in, for example, the non-rewritable memory 22b.

Specifically, when receiving the CAN message for rewriting transmitted from the at least one external device, the CPU 21A executes the memory rewriting program.

Specifically, in step S310, the CPU 21A sends, to the sub microcomputer 30, a communication disabling instruction via the AND gate 69b of the level adjusting circuit 60 or the adjusting circuit 50, transceiver 60, and communication bus 10. This allows the sub microcomputer 30 to stop communications with the level adjusting circuit 60.

Next, the CPU 21A sends, to the level lock circuit 86 of the level adjusting circuit 60, the disabling control signal as a private communication request. The disabling control signal permits the level lock circuit 86 to disable all communication lines between the sub microcomputer 30 and the level adjusting circuit 60 in step S320. Thus, the private communication routes between the main microcomputer 20B and the at least one external device via the level adjusting circuit 60, the bus transceiver 50, and the communication bus 10 are established.

Next, the CPU 21A communicates with the at least one external device as the rewriting-instruction source via the private communication routes so as to receive pieces of data and/or programs for rewriting in step S330. Then, the CPU 21A updates pieces of critical data and/or programs stored in the rewritable memory 22b to corresponding pieces of data and/or programs for rewriting received thereby until it determines that the update is completed in steps S330, 340 and S350.

Thus, when it is determined that the update is completed in step 350, the CPU 21 stops the output of the disabling control signal as the private communication request to the level lock circuit 86 of the level adjusting circuit 60 via the input terminal T2 in step S360. This allows the communication routes between the sub microcomputer 30B and the level adjusting circuit 60 to be enabled.

It is to be noted that, in step S360, enabling of the communication routes between the sub microcomputer 30B and the level adjusting circuit 60 can be carried out when power supply to the ECU 2G or the main microcomputer 20B is interrupted or when the main microcomputer 20B is restarted after completion of the rewriting.

Next, the CPU 21A sends, to the sub microcomputer 30, a communication enabling instruction via the AND gate 69b of the level adjusting circuit 60 or the adjusting circuit 50, transceiver 60, and communication bus 10. This allows the sub microcomputer 30 to restart communications with the level adjusting circuit 60. Thereafter, the CPU 21A returns to the main routine for control of the at least one target device.

As described above, in the ECU 2G of this eighth embodiment, when a CAN message for rewriting is transmitted from at least one external device on the communication bus 10 to the main microcomputer 20B, the disabling control signal as the private communication request is output from the main microcomputer 20B to the sub microcomputer 30. This allows private communication routes between the main microcomputer 20B and the at least one external device via the level adjusting circuit 60, the bus transceiver 50, and the communication bus 10 to be established.

After establishment of the private communication routes between the main microcomputer 20B and the at least one external device, communications required to rewrite critical pieces of data and/or critical programs stored in the rewritable memory 22b are carried out between the main microcomputer 20B and the at least one external device through the private communication routes.

Accordingly, for rewriting pieces of data and/or programs stored in the rewritable memory 22b of the main microcomputer 20B, it is possible for the at least one external device on the communication bus 10 to transmit pieces of data and/or programs for rewriting to the main microcomputer 20B with little influence from communication operations of the sub microcomputer 30. This allows the pieces of data and/or programs for updating to the main microcomputer 20B to be transmitted for a short time.

Therefore, even if the main and sub microcomputers 20B and 30 are installed in the ECU 2G, an update time required to update pieces of data and/or programs stored in the main microcomputer 20B can be kept short.

As in the case of the main microcomputer 20B, update of pieces of data and/or programs stored in a rewritable are of the memory 30 can be carried out with an update time kept short.

In the eighth embodiment, as described above, when it is determined that the update through the established private communication routes is completed, the output of the disabling control signal as the private communication request to the level lock circuit 86 of the level adjusting circuit 60 via the input terminal T2 is stopped (see steps S350 and S360). As a result, the communication routes between the sub microcomputer 30B and the level adjusting circuit 60 is enabled. This allows the main microcomputer 20B to continuously communicate with the at least one external device via the established private communication routes with little influence from the communication routes between the main microcomputer 20 and the level adjusting circuit 60.

In the first to eighth embodiments and their modifications, each of the ECUs 2, 2A to 2G is installed in a vehicle, and the communication bus 10 is designed as the CAN bus (CAN_H and CAN_L lines), but the present invention is not limited to the structure.

Specifically, other various communication buses, such as a LIN bus, in which pieces of communication data are transferred by controlling the electric level of each communication bus to different electric levels one of which is dominant than the other on each communication bus can be used as the communication bus 10. In addition, other various electronic control units capable of communicating pieces of data through the communication buses as different electric levels can be used as the ECUs 2, 2A to 2G. The ECUs 2, 2A to 2G and the other various ECUs can be installed in equipment in which the communication bus 10 or at least one of the communication buses has been provided.

In the first to eighth embodiments and their modifications, signals as the disabling control signal to be input to the level adjusting circuits can be generated by external devices and can be input to the ECUs therefrom via the communication bus 10 or by radio.

In the first to eighth embodiments, the ECU is composed of a main microcomputer and a sub microcomputer as control circuits for controlling the at least one target device, but can be composed of three or more microcomputers as control circuits for controlling at least one target device.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. An electronic control unit comprising:
    a bus transceiver communicable to an external communication bus external to the electric control unit, the external communication bus allowing data with an electrical dominant level to be asserted thereon in priority to data with an electrical recessive level different from the electrical dominant level, the electrical dominant level being higher in priority than the electrical recessive level;
    a first control circuit for control of a first target, the first control circuit working to generate first data for transfer via the external communication bus and transmit the generated first data;
    a second control circuit for control of a second target, the second control circuit working to generate second data for transfer via the external communication bus and transmit the generated second data, the first data and second data generated by the first and second control circuits each having any one of a first electric level and a second electric level, the first and second electric levels being used in the electronic control unit, the electric dominant level and electric recessive level being used in the external communication bus, the first and second electric levels corresponding to the electric dominant and recessive levels, respectively; and
    a level adjusting circuit communicable to the first and second control circuits and the bus transceiver and configured to:
        receive the first data and second data respectively transmitted from the first and second control circuits;
        when the first data and the second data are simultaneously received, merge the first data and the second data such that the first electric level wins with the second electric level; and
        output the merged data to the bus transceiver,
    the bus transceiver being configured to transmit the merged data via the external communication line by converting the first electric level and the second electric level of the merged data into the electrical dominant level and the electrical recessive level, respectively,
    wherein the level adjusting circuit includes a disabling circuit coupled to at least one communication route between the level adjusting circuit and each of the individual first control circuit, the second control circuit, and the bus transceiver, the disabling circuit working to disable at least one of the communication routes upon establishment of a predetermined disabling condition by controlling a level of data to be transmitted through the at least one of the communication routes, the predetermined disabling condition being associated with a corresponding at least one of the communication routes.

2. An electronic control unit according to claim 1, further comprising a monitor circuit communicable to the first and second control circuits and configured to monitor the output data from the level adjusting circuit and to transfer the monitored output data to each of the first and second control circuits, wherein the second control circuit is configured to:
    transmit the second data with the second electric level before receiving the monitored output data transferred from the monitor circuit and representing a result of the merge, and
    stop transmission of the second data until transmission of the first data to the level adjusting circuit is determined to be completed when receiving the monitored output data transferred from the monitor circuit and representing the result of the merge.

3. An electronic control unit according to claim 1, wherein the level adjusting circuit is configured to, when the first data and the second data are simultaneously received, carry out logical AND operation of the first data and the second data such that the first electric level is a predetermined low level and the second electric level is a predetermined high level higher than the low level.

4. An electronic control unit according to claim 1, wherein the disabling circuit works to lock the level of the data to be input via the at least one of the communication routes to the level adjusting circuit to the second electric level so as to disable data input via the at least one of the communication routes.

5. An electronic control unit according to claim 1, wherein the disabling circuit works to lock the level of the data to be transmitted toward the at least one of the communication routes to the second electric level so as to disable data output via the at least one of the communication routes.

6. An electronic control unit according to claim 1, wherein the first electric level corresponds to a ground voltage level, and the second electric level corresponds to a predetermined voltage level, and the disabling circuit has an output terminal coupled to the at least one of the communication routes, and works to lock a level of the output terminal to the ground voltage level so as to disable data output via the at least one of the communication routes.

7. An electronic control unit according to claim 1, wherein the disabling circuit works to keep the disabling of the at least one of the communication routes until establishment of a predetermined enabling condition, the predetermined enabling condition being associated with the at least one of the communication routes.

8. An electronic control unit according to claim 1, wherein the level adjusting circuit includes:
an operational state monitoring circuit works to monitor an operational state of at least one of the first control circuit, the second control circuit, and the bus transceiver to determine whether the operational state of at least one of the first control circuit, the second control circuit, and the bus transceiver is normal based on the monitored operational state, the disabling ciruit working to disable at least one of the communication routes when it is determined that the operational state of at least one of the first control circuit, the second control circuit, and the bus transceiver is abnormal, the at least one of the communication routes corresponding to the at least one of the first control circuit, the second control circuit, and the bus transceiver.

9. An electronic control unit according to claim 8, wherein the operational state monitoring circuit works to monitor, as the operational state, a power supply voltage to be supplied to at least one of the first control circuit, the second control circuit, and the bus transceiver to determine whether the operational state of at least one of the first control circuit, the second control circuit, and the bus transceiver is normal based on the monitored power supply voltage, and the disabling circuit works to disable at least one of the communication routes when it is determined that the power supply voltage to be supplied to at least one of the first control circuit, the second control circuit, and the bus transceiver is abnormal, the at least one of the communication routes corresponding to the at least one of the first control circuit, the second control circuit, and the bus transceiver.

10. An electronic control unit according to claim 8, wherein the first control circuit is a main control circuit that allows control of the second control circuit, the operational state monitoring circuit works to monitor, as the operational state, a power supply voltage to be supplied to the main control circuit to determine whether the power supply voltage to be supplied to the main control circuit is normal, and the disabling circuit works to disable one of the communication routes between the level adjusting circuit and the main control circuit and another one of the communication routes between the level adjusting curcuit and the second control circuit when it is determined that the power supply voltage to be supplied to the main control circuit is abnormal.

11. An electronic control unit according to claim 1, wherein the level adjusting unit includes:
an input data monitoring circuit works to monitor input data to be input to the level adjusting circuit via at least one of the communication routes from a corresponding at least one of the first control circuit, the second control circuit, and the bus transceiver to determine whether the input data to be input to the level adjusting circuit via at least one of the communication routes is normal based on the monitoring, the disabling circuit working to disable at least one of the communication routes when it is determined that the input data to be input to the level adjusting circuit via the at least one of the communication routes from a corresponding at least one of the first control circuit, the second control circuit, and the bus transceiver is abnormal as the predetermined disabling condition.

12. An electronic control unit according to claim 1, wherein an input terminal is coupled to the level adjusting circuit it and at least one of the first control circuit, the second control circuit, and the bus transceiver via a corresponding at least one of the communication routes, the input terminal allowing a disabling control signal corresponding to the at least one of the first control circuit, the second control circuit, and the bus transceiver to be input to the level adjusting circuit, the disabling circuit working to disable at least one of the communication routes when the disabling control signal is inputted thereto from the input terminal as the predetermined disabling condition.

13. An electronic control unit according to claim 12, wherein the disabling circuit works to disable the at least one of the communication routes when the disabling control signal input from the input terminal has a predetermined electrical level corresponding to open of the input terminal.

14. An electronic control unit according to claim 12, wherein the disabling circuit works to disable the at least one of the communication routes when the disabling control signal input from the input terminal has a predetermined electrical level corresponding to interruption of power supply via the input terminal to the at least one of the first control circuit, the second control circuit, and the bus transceiver.

15. An electronic control unit according to claim 1, wherein each of the first and second control circuits allows an operational mode thereof to be shifted from normal operational mode to another operational mode, the disabling circuit working to disable at least one of the communication routes for one of the first and second control circuits when the one of the first and second control circuits shifts the operation mode thereof from the normal operational mode to another operational mode as the predetermined disabling condition.

16. An electronic control unit according to claim 15, wherein the one of the first and second control circuits is operative to output an operational mode signal indicative of the operational mode of the one of the first and second control circuits, and the disabling circuit works to receive the operational mode signal and to disable at least one of the communication routes for the one of the first and second control circuits when the received operational mode signal represents another operational mode.

17. An electronic control unit according to claim 15, wherein the one of the first and second control circuits is operative to shift the operational mode thereof according to an instruction sent from the other of the first and second control circuits, and the disabling circuit works to disable at least one of the communication routes for the one of the first and second control circuits according to data output from the other of the first and second control circuits, the output data representing the operational mode shift of the one of the first and second control circuits.

18. An electronic control unit according to claim 17, wherein the other of the first and second control circuits is a main control circuit operative to send the instruction to the one of the first and second control circuits, and the disabling circuit works to disable at least one of the communication routes for the one of the first and second control circuits according to the data output from the main control circuit.

19. An electronic control unit according to claim 1, further comprising a power supply circuit connected to each of the first control circuit, the second control circuit, the bus transceiver, and the level adjusting circuit, and configured to supply power to each of the first control circuit, the second control circuit, the bus transceiver, and the level adjusting circuit, wherein the power supply circuit allows an operational mode of each of the first and second control circuits to be shifted from normal operational mode to another operational mode, the disabling circuit working to disable at least one of the communication routes for at least one of the first and second control circuits according to data output from the power supply circuit, the output data representing the operational mode shift of the at least one of the first and second control circuits as the predetermined disabling condition.

20. An electronic control unit according to claim 1, further comprising a power supply circuit connected to each of the first control circuit, the second control circuit, the bus transceiver, and the level adjusting circuit and configured to carry out, based on a power control signal, supply and/or interruption of power to each of the first control circuit, the second control circuit, the bus transceiver, and the level adjusting circuit, the power control signal being externally input to the power supply circuit, wherein the disabling circuit is coupled to the power supply circuit, the disabling circuit working to disable at least one of the communication routes for corresponding at least one of the first circuit, the second circuit, and the bus transceiver according to the power control signal to be input to the power supply circuit when the power control signal represents interruption of power supply from the power supply circuit to the at least one of the first control circuit, the second control circuit, and the bus transceiver.

21. An electronic control unit according to claim 1, further comprising a power supply control circuit connected to each of the first control circuit, the second control circuit, the bus transceiver, and the level adjusting circuit, and configured to control power to be supplied to each of the first control circuit, the second control circuit, the bus transceiver, and the level adjusting circuit, wherein disabling circuit is coupled to the power supply control circuit, the disabling circuit working to, when there is an abnormality in power control of the power supply control circuit for at least one of the first control circuit, the second control circuit, and the bus transceiver, disable at least one of the communication routes for the at least one of the first circuit, the second circuit, and the bus transceiver.

22. An electronic control unit according to claim 1, wherein, when a private communication request for one of the first and second control circuits is externally input to the level adjusting circuit, the disabling circuit works to disable at least one of the communication routes between the level adjusting circuit and the other of the first and second control circuits so as to provide a private communication route between the one of the first and second control circuits and the level adjusting circuit.

23. An electronic control unit according to claim 22, wherein the private communication request is input via the bus transceiver and the level adjusting circuit from an external unit communicably coupled to the external communication bus when the external unit wants to write data into the one of the first and second control circuits, the external unit being external of the electronic control unit.

24. An electronic control unit according to claim 22, wherein the disabling circuit works to keep disabling of at least one of the communication routes between the level adjusting circuit and the other of the first and second control circuits until the data writing from the external unit into the one of the first and second control circuits is completed.

25. An electronic control unit according to claim 1, further comprising a power supply circuit connected to each of the first control circuit, the second control circuit, the bus transceiver, and the level adjusting circuit, and configured to supply power to each of the first control circuit, the second control circuit, the bus transceiver, and the level adjusting circuit, the power supply circuit being configured to continuously supply power to the level adjusting circuit while at least one of the first control circuit, the second control circuit, and the bus transceiver is running.

26. An electronic control unit according to claim 1, further comprising a power supply circuit connected to each of the first control circuit, the second control circuit, the bus transceiver, and the level adjusting circuit, and configured to supply power to each of the first control circuit, the second control circuit, the bus transceiver, and the level adjusting circuit, wherein at least part of the level adjusting circuit and the power supply circuit are packaged with each other on/in single integrated circuit.

27. An electronic control unit according to claim 1, wherein at least part of the level adjusting circuit and the bus transceiver are packaged with each other on/in single integrated circuit.

28. An electronic control unit according to claim 1, wherein at least part of the level adjusting circuit and at least one of the first and second control circuits are packaged with each other on/in single integrated circuit.

29. An electronic control unit comprising:
a bus transceiver communicable to a communication bus, the communication bus allowing data with an electrical dominant level to be asserted thereon in priority to data with an electrical recessive level different from the electrical dominant level, the electrical dominant level being higher in priority than the electrical recessive level;
a first control circuit for control of a first target, the first control circuit working to generate first data for transfer via the communication bus and transmit the generated first data;
a second control circuit for control of a second target, the second control circuit working to generate second data for transfer via the communication bus and transmit the generated second data, the first data and second data generated by the first and second control circuits each having any one of a first electric level and a second electric level, the first and second electric levels corresponding to the electric dominant and recessive levels, respectively; and a level adjusting circuit communicable to the first and second control circuits and the bus transceiver and configured to:
 receive the first data and second data respectively transmitted from the first and second control circuits;
 when the first data and the second data are simultaneously received, merge the first data and the second data such that the first electric level wins with the second electric level; and
 output the merged data to the bus transceiver,
wherein the first electric level corresponds to a ground voltage level, and the second electric level corresponds to a predetermined voltage level, and the level adjusting circuit is configured to:
invert the received first data and second data in electric level from a corresponding one of the first and second electric levels to the other thereof;
transfer the inverted first data and second data therein;
combine the transferred first data and second data such that the second electric level is given priority over the first electric level; and
invert the combined data from a corresponding one of the first and second electric levels to the other thereof to thereby output the inverted data.

30. An electronic control unit comprising:
a bus transceiver communicable to a communication bus, the communication bus allowing data with an electrical dominant level to be asserted thereon in priority to data with an electrical recessive level different from the electrical dominant level, the electrical dominant level being higher in priority than the electrical recessive level;
a first control circuit for control of a first target, the first control circuit working to generate first data for transfer via the communication bus and transmit the generated first data;
a second control circuit for control of a second target, the second control circuit working to generate second data for transfer via the communication bus and transmit the generated second data, the first data and second data generated by the first and second control circuits each having any one of a first electric level and a second electric level, the first and second electric levels corresponding to the electric dominant and recessive levels, respectively; and
a level adjusting circuit communicable to the first and second control circuits and the bus transceiver and configured to:
 receive the first data and second data respectively transmitted from the first and second control circuits;
 when the first data and the second data are simultaneously received, merge the first data and the second data such that the first electric level wins with the second electric level; and
 output the merged data to the bus transceiver,
wherein the level adjusting circuit includes a disabling circuit coupled to at least one communication route between the level adjusting circuit and each of the individual first control circuit, the second control circuit, and the bus transceiver, the disabling circuit working to disable at least one of the communication routes upon establishment of a predetermined disabling condition, the predetermined disabling condition being associated with a corresponding at least one of the communication routes, and
wherein, when a direct communication request indicative of direct communications of the first and second control circuits is input to the level adjusting circuit, the disabling circuit works to disable the communication routes except for at least one communication route between the level adjusting circuit and each of the first and second control circuits according to the direct communication request.

31. An electronic control unit according to claim 30, wherein the direct communication request is input to the level adjusting circuit from at least one of the first control circuit, the second control circuit, and the bus transceiver.

32. An electronic control unit according to claim 31, wherein the bus transceiver includes a bus communication monitoring circuit connected to the communication bus and configured to: monitor a state of the communication bus; and output the direct communication request to the level adjusting circuit so as to be input thereto when it is determined that an abnormality occurs in the communication bus based on the monitoring.

33. An electronic control unit according to claim 31, wherein one of the first and second control circuits works to communicate with the other thereof to determine direct communications therebetween, and sends the direct communication request to the level adjusting circuit, and the disabling circuit works to disable at least one communication route between the first and second control circuits according to the direct communication request.

34. An electronic control unit according to claim 30, wherein the direct communication request is input to the level adjusting circuit from the exterior of the electronic control unit.

35. An electronic control unit according to claim 34, wherein the direct communication request is input to the level adjusting circuit from an external device communicably coupled to the electronic control unit, the external device allowing an operational mode of the electronic control unit to be directly or indirectly determined.

36. An electronic control unit comprising:
a bus transceiver communicable to a communication bus, the communication bus allowing data with an electrical dominant level to be asserted thereon in priority to data with an electrical recessive level different from the electrical dominant level, the electrical dominant level being higher in priority than the electrical recessive level;
a first control circuit for control of a first target, the first control circuit working to generate first data for transfer via the communication bus and transmit the generated first data;
a second control circuit for control of a second target, the second control circuit working to generate second data for transfer via the communication bus and transmit the generated second data, the first data and second data generated by the first and second control circuits each having any one of a first electric level and a second electric level, the first and second electric levels corresponding to the electric dominant and recessive levels, respectively; and
a level adjusting circuit communicable to the first and second control circuits and the bus transceiver and configured to:
 receive the first data and second data respectively transmitted from the first and second control circuits;

when the first data and the second data are simultaneously received, merge the first data and the second data such that the first electric level wins with the second electric level; and output the merged data to the bus transceiver, wherein the level adjusting circuit includes a disabling circuit coupled to at least one communication route between the level adjusting circuit and each of the individual first control circuit, the second control circuit, and the bus transceiver, the disabling circuit working to disable at least one of the communication routes upon establishment of a predetermined disabling condition, the predetermined disabling condition being associated with a corresponding at least one of the communication routes, and wherein the level adjusting circuit includes a communication route switching circuit configured to, when the disabling circuit disables at least one of the communication routes between the level adjusting circuit and the bus transceiver, establish at least one communication route in the level adjusting circuit between the first and second communication routes via the level adjusting circuit so as to allow data to be directly communicated between the first and second control circuits via the established at least one communication route without via the bus transceiver.

37. An electronic control unit according to claim 36, wherein the communication route switching circuit includes a delay circuit provided on the established at least one communication route, the delay circuit working to delay the data to be communicated via the established at least one communication path.

* * * * *